United States Patent
Fishwick et al.

(10) Patent No.: US 9,222,490 B2
(45) Date of Patent: Dec. 29, 2015

(54) PILOT-OPERATED QUICK EXHAUST VALVE

(75) Inventors: James Fishwick, Wigan (GB); Gary T. Jacobson, Cheshire (GB)

(73) Assignee: Bifold Fluidpower Limited, Manchester (GB)

( * ) Notice: Subject to any disclaimer, the term of this patent is extended or adjusted under 35 U.S.C. 154(b) by 816 days.

(21) Appl. No.: 13/457,076

(22) Filed: Apr. 26, 2012

(65) Prior Publication Data

US 2012/0216882 A1    Aug. 30, 2012

Related U.S. Application Data

(60) Division of application No. 12/466,082, filed on May 14, 2009, now abandoned, which is a continuation-in-part of application No. 12/114,453, filed on May 2, 2008, now Pat. No. 8,205,632.

(30) Foreign Application Priority Data

Jul. 11, 2008  (GB) .................................. 0812731.8
Oct. 10, 2008  (GB) .................................. 0818599.3

(51) Int. Cl.
*F16K 11/07*    (2006.01)
*F15B 13/04*    (2006.01)
(Continued)

(52) U.S. Cl.
CPC ......... *F15B 13/0405* (2013.01); *F15B 13/0422* (2013.01); *F16K 11/048* (2013.01);
(Continued)

(58) Field of Classification Search
CPC ............. F15B 13/0405; F15B 13/0426; F15B 13/04522; F15B 13/048; F16K 31/122; F16K 31/1223; F16K 31/124; F16K 31/1268; Y10T 137/87193; Y10T 137/86582; Y10T 137/7762
USPC .............. 137/102, 485, 487, 488, 492, 492.5; 251/28, 29
See application file for complete search history.

(56) References Cited

U.S. PATENT DOCUMENTS 2,570,373 A * 10/1951 Peacock, Jr. ................. 48/180.1
2,637,946 A *  5/1953 Parks ......................... 137/489.5
(Continued)

FOREIGN PATENT DOCUMENTS

GB    2355510       4/2001
WO    2008/065392   6/2008

OTHER PUBLICATIONS

Office Action from the United States Patent and Trademark Office for U.S. Appl. No. 12/466,082 dated Aug. 29, 2012 (18 pages).

*Primary Examiner* — Jessica Cahill
(74) *Attorney, Agent, or Firm* — Michael Best & Friedrich LLP

(57) ABSTRACT

A fluid flow control device has an inlet, an outlet and an exhaust port all for an operating fluid. A pilot inlet receives a pilot pressure signal which operates a valve stem actuator via a piston. The valve stem is operable to open a supply valve between the inlet and outlet and, to open an exhaust valve disposed between the outlet and the exhaust. In a further position both the valves are closed. A first fluid leak path is provided between the valve stem and the supply valve for allowing fluid to leak through the supply valve chamber when the supply valve is open and a second fluid leak path is defined by the exhaust valve for allowing fluid to leak through the exhaust valve chamber. The leak paths provide for a force balancing arrangement. A quick exhaust feature allows exhaust flow through the device.

10 Claims, 9 Drawing Sheets

(51) Int. Cl.
*F15B 13/042* (2006.01)
*F16K 11/048* (2006.01)
*F16K 31/122* (2006.01)
*F16K 31/126* (2006.01)

(52) U.S. Cl.
CPC ........... *F16K31/122* (2013.01); *F16K 31/1268* (2013.01); *Y10T 137/7762* (2015.04); *Y10T 137/86582* (2015.04); *Y10T 137/87193* (2015.04)

(56) References Cited

U.S. PATENT DOCUMENTS

| | | | |
|---|---|---|---|
| 2,754,843 A * | 7/1956 | Hauber | 137/492.5 |
| 3,437,011 A | 4/1969 | Van Gelder | |
| 3,548,879 A | 12/1970 | Wilde | |
| 3,584,652 A | 6/1971 | Huntington et al. | |
| 3,736,960 A | 6/1973 | Cohen | |
| 3,791,398 A | 2/1974 | Vickery | |
| 3,910,045 A | 10/1975 | Herrmann | |
| 3,930,515 A | 1/1976 | Kennedy et al. | |
| 3,958,495 A | 5/1976 | Bernhoft | |
| 4,050,478 A | 9/1977 | Virture et al. | |
| 4,221,204 A * | 9/1980 | Meyer | 123/568.31 |
| 4,295,489 A * | 10/1981 | Arends et al. | 137/488 |
| 4,306,586 A | 12/1981 | Spencer | |
| 4,327,773 A | 5/1982 | Detweiler | |
| 4,461,320 A | 7/1984 | Barbagli | |
| 4,615,353 A | 10/1986 | McKee | |
| 4,621,656 A * | 11/1986 | Ichimaru | 137/625.66 |
| 4,730,543 A | 3/1988 | Holmes | |
| 4,754,776 A | 7/1988 | McKee | |
| 4,984,505 A | 1/1991 | Leeson et al. | |
| 5,313,983 A | 5/1994 | Rost et al. | |
| 5,564,673 A * | 10/1996 | Pieren | 251/30.03 |
| 5,682,918 A | 11/1997 | Stoll et al. | |
| 5,687,759 A * | 11/1997 | Tan | 137/486 |
| 5,771,931 A | 6/1998 | Watson | |
| 5,975,129 A * | 11/1999 | Williams | 137/514.7 |
| 6,209,565 B1 | 4/2001 | Hughes et al. | |
| 6,637,462 B2 | 10/2003 | Foster et al. | |
| 2004/0182074 A1 | 9/2004 | Steinke et al. | |
| 2005/0067028 A1 | 3/2005 | Ryuen et al. | |
| 2005/0115232 A1 | 6/2005 | Tondolo | |
| 2008/0066814 A1 | 3/2008 | Meinhof | |
| 2008/0196773 A1 * | 8/2008 | Franconi | 137/492.5 |

* cited by examiner

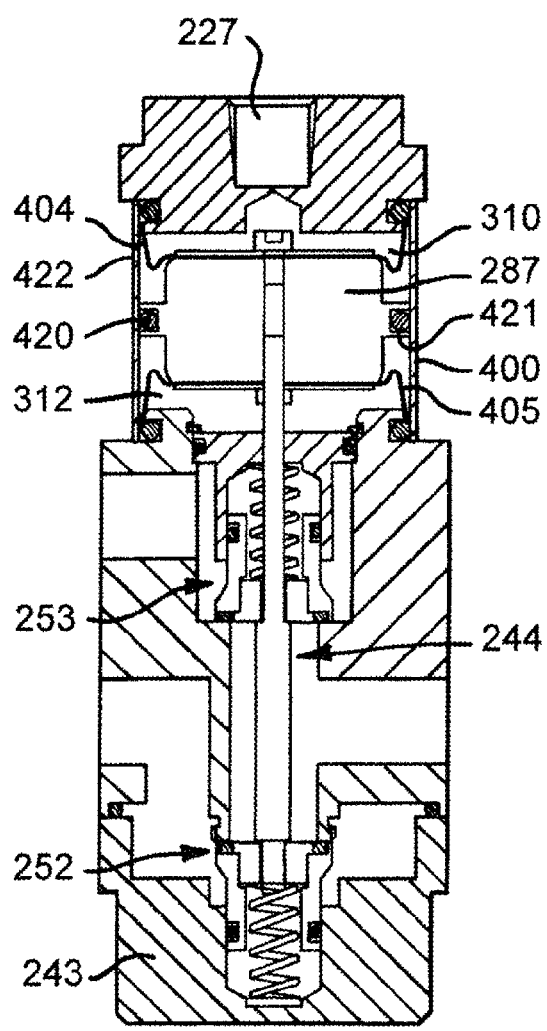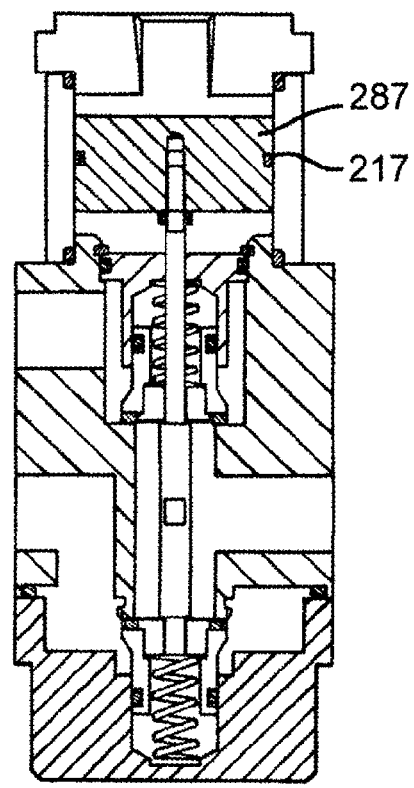
Fig. 10
Fig. 11

PILOT-OPERATED QUICK EXHAUST VALVE

CROSS-REFERENCE TO RELATED APPLICATIONS

This application is a divisional of U.S. patent application Ser. No. 12/466,082 filed May 14, 2009, which is a continuation-in-part of U.S. patent application Ser. No. 12/114,453, filed May 2, 2008, as well as British Patent Application No. 0812731.8, filed Jul. 11, 2008 and British Patent Application No. 0818599.3, filed Oct. 10, 2008; the entire contents of each application are hereby incorporated by reference.

BACKGROUND

The present invention relates to a pilot-operated quick exhaust valve for use in conjunction with a control device that is used to control the flow of pneumatic or hydraulic fluid to an actuator of the kind used to operate the position of a valve.

In many applications it is desirable to automate the actuation of a pipeline valve via a remote control system. This is particularly necessary in harsh environments such as, for example, a petrochemical pipeline located on land or offshore. The operation of, for example, a ball valve in such a pipeline is often effected by a valve positioner that provides fluid (typically pneumatic) signals to an actuator for operating the valve. A compressor delivers compressed air via a filter regulator to the positioner which controls the onward flow to the actuator by reference to position feedback signals. The regulator is required to reduce the available pressure from the compressor to a safe working level for the downstream positioner and associated pneumatic circuit. Regulators generally have a built-in filter to remove contaminants such as oil, water vapour and particulate matter.

The actuator typically comprises a piston and cylinder arrangement with a shaft associated with the piston being connected to the valve being operated. The piston divides the cylinder into a pair of chambers at least one of which may be selectively pressurised by the introduction compressed air in order to move the piston and therefore the shaft. In a single-acting piston, the other chamber is occupied by a biasing member such as a spring against which the pressurised air acts. When the pressurised air supply drops below a certain value the force applied by it to one side of the piston is less than that applied on the other side by the spring in which case the pressurised air is exhausted from the cylinder. In a double-acting piston air is selectively supplied to one of the chambers and simultaneously exhausted from the other.

The positioner generates pneumatic control signals which are not, in some applications, of sufficient volumetric flow rate to operate the actuator in the desired time period. It is therefore often necessary to employ a volume booster to ensure there is a sufficient sustained volume of fluid available to the actuator to ensure a rapid response time. Volume boosters are generally controlled by a pneumatic pilot signal received from the positioner and ensure that the pressure and volumetric flow of the fluid delivered to the actuator is sustained to achieve the desired actuator stroke speed. Separate flow regulators are often connected to the booster and this serves to increase the complexity of the system in terms of installation, servicing, maintenance and operation.

The pilot signals are generated by the positioner in response to a command signal directing the positioner to move the valve to a desired position. The command signal may be an open-loop signal or a closed-loop feedback electrical control signal that takes into account the position of the actuator. In an alternative arrangement the booster may be controlled directly by an electrical signal that operates a solenoid valve in the booster.

A known form of volume booster comprises a housing having an operating air inlet and outlet, both of which are in communication with the flow of operating air to the actuator, and a pilot signal inlet connected to an output of the positioner. The communication between the operating air inlet and outlet is selectively interrupted by a supply valve whose position is controlled by diaphragm assembly on which the pilot signal acts. The supply valve is connected to one end of a reciprocal valve stein the other end of which serves to open or close an exhaust valve in an exhaust passage defined in the diaphragm assembly. The pilot signal acts on one side of the diaphragm assembly whereas the outlet air pressure acts on the other side of the diaphragm assembly by virtue of a bleed passage in the housing from the outlet. In the event that the force applied by the pilot signal pressure to the first side of the diaphragm assembly exceeds that applied on the other side by the outlet pressure, the force differential serves to move the diaphragm assembly and valve stem to a first position in which the supply valve is open and the exhaust valve remains closed. Operating air can then flow from inlet to outlet so as to drive the actuator and position the valve. When the outlet pressure increases or the pilot signal pressure decreases to the extent that the forces on the diaphragm assembly cause it to move in the opposite direction, the diaphragm assembly moves to a second position in which the supply valve is closed and the diaphragm assembly lifts off the exhaust valve so that excess pressure can vent between the diaphragm assembly and the exhaust valve to the exhaust passage in the diaphragm assembly. The exhaust valve may be defined by a simple poppet valve on the end of the valve stem that seals against a seat defined at a bore in the diaphragm assembly. The location of the exhaust valve and passage means they tend to be relatively small and thus serve to restrict flow. The flow rate is significantly lower than that of the main flow leading to a slow reaction time. This is particularly undesirable in the event of an emergency where it is necessary to vent large volumes of air.

One solution to the problem of restricted exhaust flow is to provide a separate exhaust flow having a capacity equivalent to the main operating air flow. This may be achieved by using another booster or a quick exhaust valve both of which involve additional components, space and expense.

In one example of a separate exhaust capacity, an external conduit disposed outside the main body of the booster housing interconnects the outlet and the exhaust passage which are provided on opposite sides of the diaphragm assembly. An example of this is pneumatic volume booster Model 200XLR available from Fairchild Industrial Products Company of Winston-Salem, N.C., USA). Without the restriction imposed by the space within the body of the booster the external conduit can have a relatively large size so as to permit the exhaust flow to be as large as the main flow. This solution is relatively large and cumbersome and can therefore be disadvantageous in applications where there are space constraints.

The components of the pneumatic circuit comprising at least the regulator, positioner, volume booster and any directional control valves, are typically supported by suitable brackets on a back plate that is housed in a convenient area of a control room. It is desirable for the spaced occupied by such a circuit to be reduced as far as is possible.

The pressurised air is generally supplied to the actuator to advance the piston within the cylinder via a pneumatic supply circuit, including one or more control valves. For the piston to move in the reverse direction air is exhausted from the cylinder either through the supply circuit or in some instances it is desirable to employ a separate exhaust line with a quick exhaust valve so that air can be exhausted rapidly to atmosphere. The latter option eliminates the need for exhaust air to be directed through the control valve(s) in the supply circuit in which case the flow rate is restricted. Quick exhaust in this manner is particularly desirable when there is an emergency that requires the actuator to close the pipeline valve as quickly as possible.

Quick exhaust valves typically comprise a diaphragm supported for movement in a valve body. When the control valve is operated in a supply mode, the inlet of the valve body is connected to the air supply and the diaphragm is forced into a sealing position against an exhaust port so that the supply of pressurised air flows from the inlet to an outlet and enters the cylinder of the actuator. When the control valve is operated in an exhaust mode, there is an absence of air pressure at the inlet and the cylinder air pressure at the outlet forces the diaphragm away from the exhaust port so that air from the cylinder can pass through the valve to atmosphere.

Quick exhaust valves of the kind described above do not generally provide any modulation of exhaust flow: the exhaust outlet is either fully open to allow quick exhaust of air in the cylinder or fully closed to permit pressurisation of the cylinder.

It is an object of the present invention to obviate or mitigate the above, and other, disadvantages. It is also an object of one aspect of the present invention to provide for an improved, or alternative, fluid flow control device. It is an object of another aspect of the present invention to provide for an improved, or alternative, exhaust valve.

SUMMARY

According to the present invention there is provided a fluid flow control device comprising: a housing defining an inlet, an outlet and an exhaust port all for an operating fluid; a pilot inlet for receipt of a pilot signal; a supply path in said housing that extends between the inlet and outlet; an exhaust flow path in the housing that extends between the outlet and the exhaust port; a supply valve chamber interrupting the supply path, a supply valve supported in the supply valve chamber for movement between an open position in which it permits fluid to flow through the supply valve chamber from the inlet to the outlet and a closed position where it prevents significant fluid flow through the valve chamber to the outlet; an exhaust valve chamber in the exhaust path, an exhaust valve in the exhaust valve chamber for movement between an open position in which it permits fluid to flow through the exhaust valve chamber from the outlet to the exhaust port and a closed position where it prevents significant fluid flow through the valve chamber to the exhaust port; a reciprocal actuating member in the housing and engageable with the supply valve and the exhaust valve for moving the supply and exhaust valves between the open and closed positions, the actuating member being movable in response to a difference between the pilot signal and the outlet fluid pressure between a first position in which supply valve is closed and exhaust valve is closed, a second position in which the supply valve is open and the exhaust valve is closed, and a third position in which the exhaust valve is open and the supply valve is closed; wherein there is a first fluid leak path defined by the supply valve for allowing fluid to leak through the supply valve chamber, a second fluid leak path defined by exhaust valve for allowing fluid to leak through the exhaust valve chamber, the housing containing a fluid filter between the inlet and the outlet.

The leak paths ensure that the pressure across each valve in the open condition is balanced. This means that the force required to move the actuating member in the housing is limited and components can be reduced in size. The arrangement allows the exhaust port to be located adjacent to the exhaust valve chamber so that fluid can be vented quickly.

The device effectively operates as a flow regulator as well as a volume booster in that it ensures that the pressure of the fluid air at the outlet automatically reaches a value equivalent to that of the pilot signal at the pilot inlet.

The housing may be provided with a drain to allow for drainage of water and/or other liquids. The drain may be in the form of a valve disposed in a drain port in a wall of the housing, the valve being automatically or manually operable to open the port so as to allow drainage.

There may be provided a first biasing member for biasing the supply valve to the closed position. Similarly there may be provided a second biasing member for biasing the exhaust valve to the closed position.

The supply and exhaust valve chambers may each define a respective valve seat, the respective supply and exhaust valves being clear of the respective valve seat in the open positions and sealed against the valve seat in the closed positions.

The supply valve may comprise a poppet having a bore in which part of the actuating member is received, the first leak path being defined by a clearance between a wall of the bore in the poppet and the actuating member. The supply valve poppet may be received in a support member, a supply valve seal being received between the poppet and the support member.

The support member may be in the form of a sleeve.

The sleeve may have an outer surface and a sleeve sealing member may be disposed between the outer surface and an internal wall of the housing. The valve seal and the sleeve sealing member may be disposed such that they are aligned in the direction of movement of the supply valve between the open and closed positions.

The exhaust valve may comprise a poppet having a bore in which part of the actuating member is received, the second leak path being defined by a clearance between a wall of the bore in the poppet and the actuating member. The exhaust valve poppet may be received in a support member, an exhaust valve seal being received between the poppet and the support member.

The exhaust valve support member may be in the form of a sleeve. The exhaust valve sleeve may have an outer surface and a sleeve sealing member disposed between the outer surface and an internal wall of the housing.

The valve seal and the sleeve sealing member may disposed such that they are aligned with each other in the direction of movement of the exhaust valve between the open and closed positions.

The supply valve and exhaust valve seals may each be received in groove defined between the respective poppet and the respective sleeve, the groove having a pair of tapered walls for retaining the respective valve seal therein.

The respective poppet may have a flange and the respective sleeve may have a lip, the seal being received therebetween.

The actuating member may have any suitable form. In one particular embodiment it is in the form of an elongate valve stem reciprocally disposed in the housing and selectively and independently engageable with the supply and exhaust valves. The elongate valve stem may have a first shoulder for engaging the supply valve such that movement of the stem to the second position causes the first shoulder to engage the supply valve and move it to the open position. Similarly the valve stem may have a second shoulder for engaging the exhaust valve such that movement of the stem to the third position causes the second shoulder to engage the exhaust valve and move to the open position.

The pilot inlet is configured to receive a pilot signal in the form of a fluid pressure signal which may be provided from a positioner in response to control signals for controlling the position of the actuator.

There may be provided a piston member connected to the actuating member and disposed so as to define first and second variable volume chambers in the housing, the first variable volume chamber being in fluid communication with the pilot inlet and the second variable volume chamber being in fluid communication with the outlet such that a pressure differential between the fluid in the first and second variable volume chambers causes the piston to move and the actuating stem to move between said first, second or third positions. Alternatively the piston may be a differential piston such that it the fluid in each of the first and second chambers acts on a different surface area of the piston such that the piston is biased in a given direction of movement when the pressures in the respective variable volume chambers are equal.

The actuating member may be movable to said second position by the piston member when the fluid pressure in the first chamber exceeds that in the second chamber. This allows fluid to flow from the inlet to outlet through the supply valve chamber. The piston may be movable to the third position by the piston member when the fluid pressure in the second chamber exceeds that in the first chamber. This allows fluid to exhaust from the outlet to the exhaust port via the exhaust valve chamber, thereby acting in the manner of a pressure relief valve. Similarly it may be biased to the second position when the pressure differential between the first and second chamber is negligible.

The piston member is preferably sealed to the housing. For this purpose an outer peripheral surface of the piston may be sealed to an internal surface of the housing, the piston being sealed to the housing by a sealing member disposed between the outer periphery and the internal surface.

The actuating member may have a first end that is slidably disposed in the supply valve and a second end that is fixed to the piston member.

There may be provided a third leak path defined between the housing and a support for the exhaust valve, the leak path providing fluid communication between the exhaust valve chamber and the second variable volume chamber.

The exhaust port may be defined in the housing between the inlet and the second variable volume chamber. It may be defined immediately adjacent to the exhaust valve chamber and may be substantially the same size as inlet.

The filter may comprise a porous member disposed between the inlet and the supply valve and may be a cup-shaped porous member.

The drain is preferably provided at a location under the filter so that any water vapour filtered by the filter is direct to the drain under gravity.

According to a second aspect of the present invention there is provided a fluid control circuit for operation of an actuator comprising: a main fluid flow line for connection to a source of pressurised fluid and for delivering pressurised fluid to the actuator at a first volumetric flow rate; a volume booster in the main flow line having an inlet connected to the main flow line, an outlet for fluid communication with the actuator, an exhaust port for selective fluid communication with the outlet, and a pilot signal port for receipt of fluid control signals, the volume booster having a supply valve between the inlet and the outlet and an exhaust valve between the outlet and the exhaust, the valves being operable in response to a pressure difference between the pilot signal port and the outlet between first position in which the supply valve is closed and exhaust valve is closed, a second position in which the supply valve is open and the exhaust valve is closed, and a third position in which the exhaust valve is open and the supply valve is closed, the booster being configured to regulate the flow of fluid in the main flow line to the actuator; a control flow line upstream of the volume booster and connected to the main flow line, for delivering control fluid at a second volumetric flow rate which is lower than the first volumetric flow rate; a positioner in the control flow line and in fluid communication with a pilot signal port of the volume booster, the positioner being configured to deliver fluid control signals to the pilot signal port; and a fluid regulator in the control flow line upstream of the positioner.

The arrangement allows for a low volumetric rate regulator to be used in the control flow line as opposed to a high volumetric flow rate regulator in the main flow line upstream of the control flow line. This is because the volume booster effectively regulates the flow in the main flow line. Moreover, it allows for the volume booster to be connected to an outlet of an unregulated source of pressurised fluid without risk of damage to the booster. It may thus for example be connected to a compressor with an unregulated output pressure of up to 20 bar without the need for an intermediate regulator.

There may be a filter in the control flow line and a filter in the volume booster. This eliminates the need for a filter in the main flow line upstream of the booster. The volume booster may have an integral filter disposed between the inlet and the outlet.

There is preferably no regulator provided in the main flow line upstream of the volume booster and downstream of the source of pressurised air.

The volume booster may have an integral drain for draining water therefrom.

The fluid regulator may be disposed upstream of the positioner.

At least one directional control valve may be disposed between the positioner and the volume booster. The, or each, directional control valve may be stacked with the volume booster, that is the housing of the valve is stacked against the housing of the volume booster with respective inlet, outlet and other ports aligned for fluid communication. Each valve in the circuit may be stacked up against each other.

The circuit is preferably a pneumatic circuit with the main flow and control flow lines transporting pneumatic fluid. However, other fluids may be used.

A compressor may provide compressed air as the source of pressurised fluid.

The outlet of the volume booster may be in fluid communication with an actuator for a valve.

The volume booster in the circuit may comprise any of the features defined above.

According to a third aspect of the present invention there is provided a fluid control circuit for operation of an actuator comprising: a main fluid flow line for connection to a source of pressurised fluid and for delivering pressurised fluid to the actuator at a first volumetric flow rate; a volume booster in the main flow line having an inlet connected to the main flow line, an outlet for fluid communication with the actuator, an exhaust port for selective fluid communication with the outlet, and a pilot signal port for receipt of fluid control signals, the volume booster having a supply valve between the inlet and the outlet and an exhaust valve between the outlet and the exhaust, the valves being operable in response to a pressure difference between the pilot signal port and the outlet between first position in which the supply valve is closed and exhaust valve is closed, a second position in which the supply valve is open and the exhaust valve is closed, and a third position in which the exhaust valve is open and the supply valve is closed, the booster being configured to regulate the flow of fluid in the main flow line to the actuator; a control flow line upstream of the volume booster and connected to the main flow line, for delivering control fluid at a second volumetric flow rate which is lower than the first volumetric flow rate; a positioner in the control flow line and in fluid communication with a pilot signal port of the volume booster, the positioner being configured to deliver fluid control signals to the pilot signal port; wherein in the third position the exhaust valve is configured such that when pressurised fluid in the outlet exceeds the pressure of the pressurised fluid at the pilot signal port, the excess pressure is relieved through the exhaust port.

The arrangement thus eliminates the requirement for a downstream pressure relief valve in the circuit.

According to a fourth aspect of the present invention there is provided a pilot-operated quick exhaust valve for exhausting fluid from a fluid actuator and comprising: a housing; the housing defining an inlet port for connection to an exhaust of the fluid actuator, a pilot control port for receipt of a pilot control signal and at least one exhaust port; a valve assembly reciprocal within the housing and comprising a piston connected to a valve member; the piston being disposed in the housing to define on a first side of the piston a variable volume pilot pressure chamber in fluid communication with the pilot port and, on a second side of the piston, a variable volume inlet pressure chamber in fluid communication with the inlet port, such that the piston is moveable in response to a pressure difference between the pilot port and the inlet port; the valve member being moveable with the piston between a first position in which it blocks fluid communication between the at least one exhaust port and the inlet port and a second position in which it opens the at least one exhaust port to allow for a maximum flow from the inlet and out through the at least one exhaust port; wherein the valve member is biased to the first position by a biasing member, and movement of the piston in a direction such that the pilot pressure chamber decreases in volume moves the valve member towards the second position against the biasing force applied by the biasing member.

The valve member may be moveable relative to at least one exhaust port through an infinite or discrete number of positions so as to expose the, or each, port progressively, thereby allowing modulated exhaust flow dependent on the pressure difference between the fluid in the pilot pressure and inlet pressure chambers. The valve member may be movable over the at least one exhaust port so as to expose the, or each, port progressively. Alternatively, there may be provided a valve seat associated with the inlet and against which the valve member is sealed in the first position and away from which the valve member is progressively moved when moving towards the second position.

The valve member may be penetrated by at least one passage to allow fluid to flow from the inlet to the second side of the piston. Alternatively at least one leak passage may be provided between the valve member and the housing.

The valve assembly may further comprise a valve stem, which may be elongate, on which the piston and valve member are supported. The piston may be fixed to the valve stem. The valve member may be movable relative thereto in the direction of a longitudinal axis of the stem. There may be a stop on the valve stem that prevents relative movement in one direction beyond the stop.

The at least one exhaust port may be disposed outboard of the valve member and may be radially outboard such that the outer periphery of the valve member slides over the at least one exhaust port.

An outlet port may be provided in the housing, the outlet port being connectable to a supply port of the fluid actuator. A supply valve member may be provided as part of the valve assembly and preferably on the valve stem, the supply valve member being disposed between the inlet and the outlet ports and movable between an open position in which fluid can flow from the inlet to the outlet to pressurise the actuator and a closed position in which such flow is prevented, the movement of the supply valve member being dictated by the movement of the piston is response to the pressure across it.

The housing may have an internal wall disposed such that the inlet pressure chamber is sub-divided into a first variable volume chamber defined between the valve member and the internal wall and a second variable volume chamber defined between the other between the internal wall and the piston. The internal wall may be penetrated by at least one leak passage to allow fluid to flow between the first and second variable volume chambers. The leak passage may be provided by a clearance between the valve stem and the edge of an opening in the internal wall.

The piston may be disposed between the pilot control port and the second variable volume chamber. The piston may be sealed to the housing at its outer periphery.

A biasing member may be provided for biasing the valve member away from the internal wall. It may be provided inside the housing and may take any suitable form such as, for example, a compression spring, which may be mounted around the valve stem. The biasing member may act between the valve member and the internal wall so as to bias them apart. A recess may be provided in the valve member for receipt of at least part of the biasing member.

The valve member may abut a step on the valve stem by which it is movable away from a valve seat. The valve member may comprise a bore for receipt of the valve stem and the at least one passage may be a clearance between an edge of the bore and the valve stem. The valve member may be in the form of a poppet which may be received in a support member. A seal may be disposed between the poppet and the support member by which the valve member may be sealed to the valve seat. The support member may be in the form of a sleeve which may be movable in a recess in the internal wall. The biasing member may be disposed inside the support member. A sleeve sealing member may be provided between an outer surface of the support member and the internal wall.

The fluid is preferably pneumatic but may be hydraulic.

According to a fifth aspect of the present invention there is provided a pilot-operated volume booster for controlling the volumetric flow rate of pressurised fluid from a source to a fluid actuator, the volume booster having a pilot-operated quick exhaust valve in accordance with the first aspect of the invention as defined above and for exhausting fluid from the fluid actuator.

According to a sixth aspect of the present invention there is provided a fluid control system for a fluid actuator comprising: a pressurised fluid supply line; an exhaust path; a pilot fluid control line for delivering fluid control signals; at least one pilot-operated quick exhaust valve according to the first aspect of the present invention, the inlet of the, or each, pilot-operated, quick exhaust valve being connectable to an exhaust outlet of the actuator and the, or each, pilot control port being connected to the pilot fluid control line, the at least one exhaust port being in fluid communication with the exhaust path; and a volume booster for regulating the volumetric flow rate of the fluid to the fluid actuator, the volume booster having an inlet to the supply line, an outlet connectable to a supply port of the fluid actuator, and a pilot inlet connected to the pilot fluid control line.

The volume booster and the at least one pilot-operated quick exhaust valve are thus both controlled by the same pilot control signal.

The volume booster may be of conventional configuration or may have in an integral quick exhaust valve in accordance with the fifth aspect of the invention.

BRIEF DESCRIPTION OF THE DRAWINGS

Specific embodiments of the invention will now be described, by way of example only, with reference to the accompanying drawings, in which:

FIG. 10 is a cross section of a modified version of the volume booster fluid flow control device of FIGS. 6 to 9, having a fail-safe diaphragm assembly, and in accordance with the present invention;

FIG. 11 is a cross sectional view of a yet further alternative embodiment of the volume booster fluid flow control device of the present invention;

DETAILED DESCRIPTION

Figure 1:
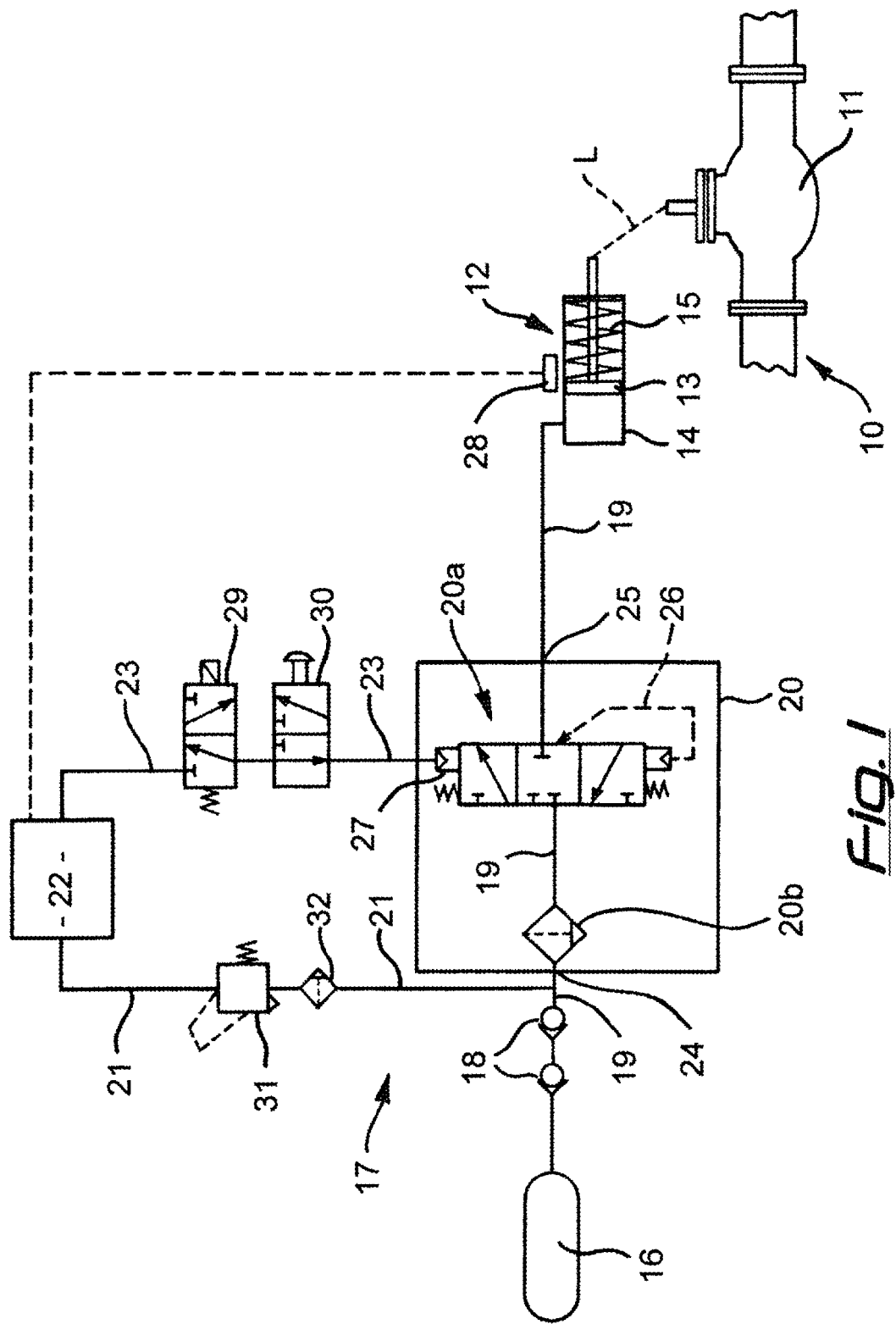
FIG. 1 is a schematic circuit diagram of a fluid pipeline with a valve, valve actuator and pneumatic control circuitry supplied with air from a compressor in accordance with the present invention.

Referring first to FIG. 1 of the drawings, a pipeline 10 for transporting fluid such as, for example, oil, petroleum, chemicals or the like is fitted with a valve 11 that is operable between open and closed positions by a pneumatically operated actuator 12, such as, in this instance, a piston 13 reciprocally disposed in a cylinder 14. In the embodiment shown the piston 13 is single-acting with a spring 15 biasing the piston in a direction against the force applied by compressed air introduced into the cylinder 14. If the spring force exceeds the force applied to the piston by the pressure of the compressed air then the air is exhausted from the cylinder 14. It will be appreciated that in an alternative embodiment of the present invention a double-acting piston cylinder arrangement may be used with compressed air being selectively introduced or exhausted from the cylinder on each side of the piston. The valve 11 may, for example, be a ball valve that is rotationally disposed within the valve body and has an actuation arm that is moveable by the adjacent actuator 12 via a suitable mechanical link L.

Compressed air for operating the actuator 12 is delivered from a compressor 16 via a pneumatic control circuit 17, although other sources of compressed air may be used. Immediately downstream of the compressor 16 there are two check valves 18 and from there the compressed air is supplied along a main flow line 19 to a device 20 that comprises a three position volume booster 20a with an integral filter and drain unit 20b and supplied along a control flow line 21 to a positioner 22. The booster 20a is operable by pneumatic control signals from the positioner 22 to ensure that there is a sufficient sustained volumetric flow rate in the main flow line 19 to pressurise the cylinder 14 so that the stroke speed of the actuator 12 is sufficiently high in a first direction. It is also operable to permit rapid exhaust of the air from cylinder 14 in the opposite direction so that the stroke speed in the reverse direction is also sufficiently rapid. The control signals are delivered to the booster 20a along a pilot line 23 from the positioner 22.

The integral volume booster and filter/drain device 20 has an operating fluid inlet 24 and outlet 25 that supply fluid (in the case of this embodiment the fluid is air) along the main flow line 19 to the actuator 12, an exhaust port 26 and a pilot port 27 for receipt of the pilot fluid (e.g. air) from the positioner 22. The inlet and outlet 24, 25 and exhaust port 26 are configured to allow air to flow at relatively high volumetric rates in comparison to the pilot port 27.

The pneumatic control signal is generated by the positioner 22 in order to move the actuator 12 to a desired position to operate the valve 10. A position sensor 28 associated with the actuator 12 may sense the position of the piston 13 within the cylinder 14 and generate an electrical signal representative of that position, which signal is fed back to the positioner 22. In this manner the positioner 22 may operate with closed-loop feedback control to determine the required pressure of the pneumatic control signal. The positioner may be microprocessor based and may incorporate transducers that convert electrical signals (e.g. current) to pneumatic pressure for this purpose.

A pair of directional control valves 29, 30 in the pilot line 23 are selectively operable to allow the pneumatic control signals to flow from the positioner 22 to the volume booster 20a. A first of the valves 29 is a two-position, three-way solenoid-operated valve that is normally closed and is selectively opened under the control of the positioner 22. The second valve 30 immediately downstream of the first 29 is a two-position, three-way manually operated emergency shut down valve that is normally open.

As the combined volume booster, integral filter and drain device 20 is able to cope with the relatively high air pressure taken directly from the compressor 16 there is no need for a conventional filter regulator upstream of the booster in the main flow line 19. Instead a much smaller low flow regulator 31 is provided in the control flow line 21. It will be appreciated that such a regulator 31 is significantly less expensive that a conventional regulator. For example, in a circuit where the compressor outlet pressure is around 20 bar it is usual for a conventional regulator in the main flow line 19 to be 1 inch in flow diameter, whereas in the embodiment of FIG. 1 the regulator may be ¼ inch or even ⅛ inch in flow diameter. The reduced flow regulator would typically be around 5 or 6 times less expensive than the conventional regulator. Similarly a low flow filter/drain 32 is provided in the control flow line 21.

It is to be understood that some aspects of this invention, such as for example, the provision of a quick exhaust valve, can be applied to a volume booster with or without an integral filter and/or drain feature.

Figure 2:
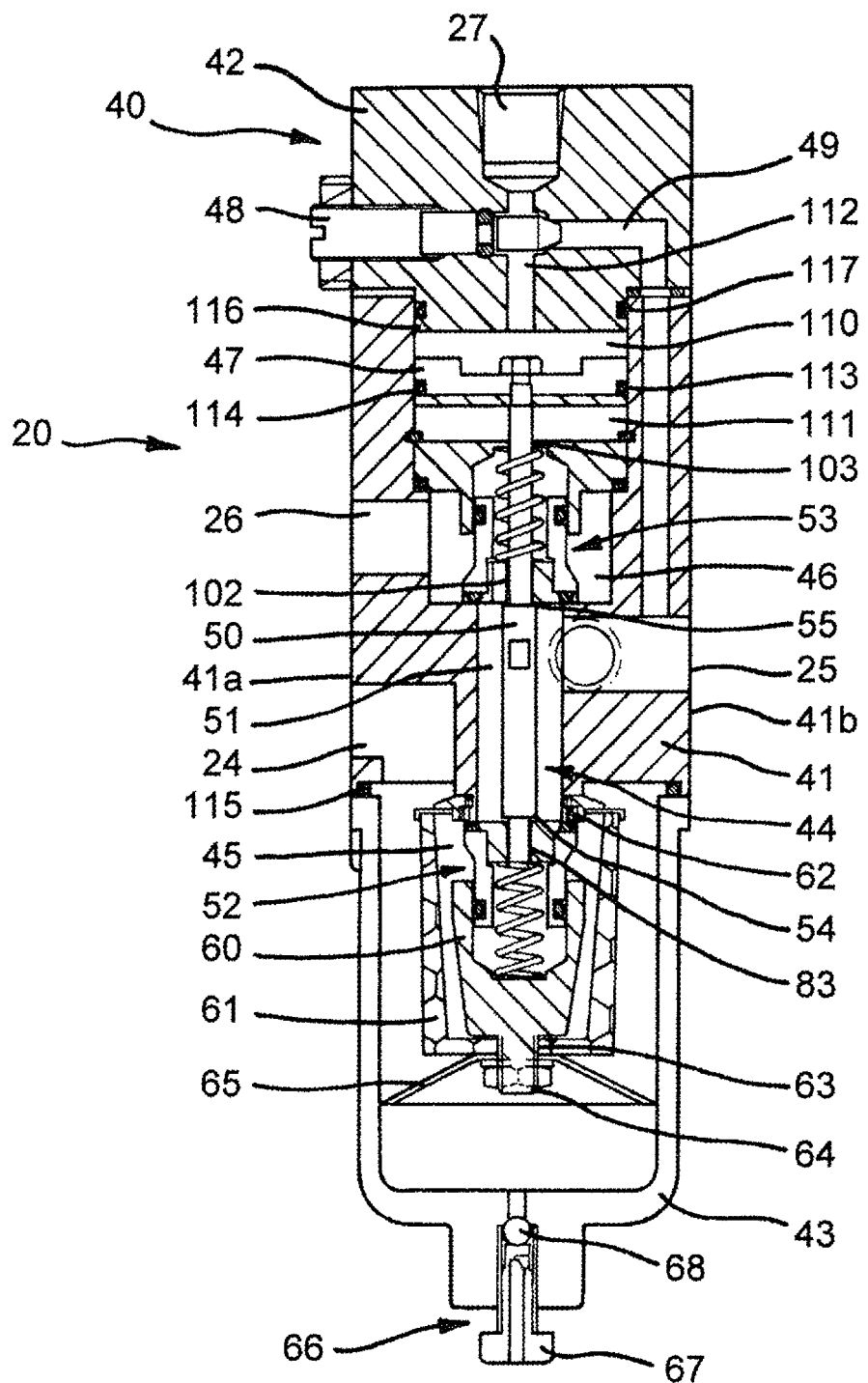
FIG. 2 is a longitudinal sectioned view of the volume booster with integral quick exhaust valve and integral filter and drain of FIG. 1.
Figure 3:
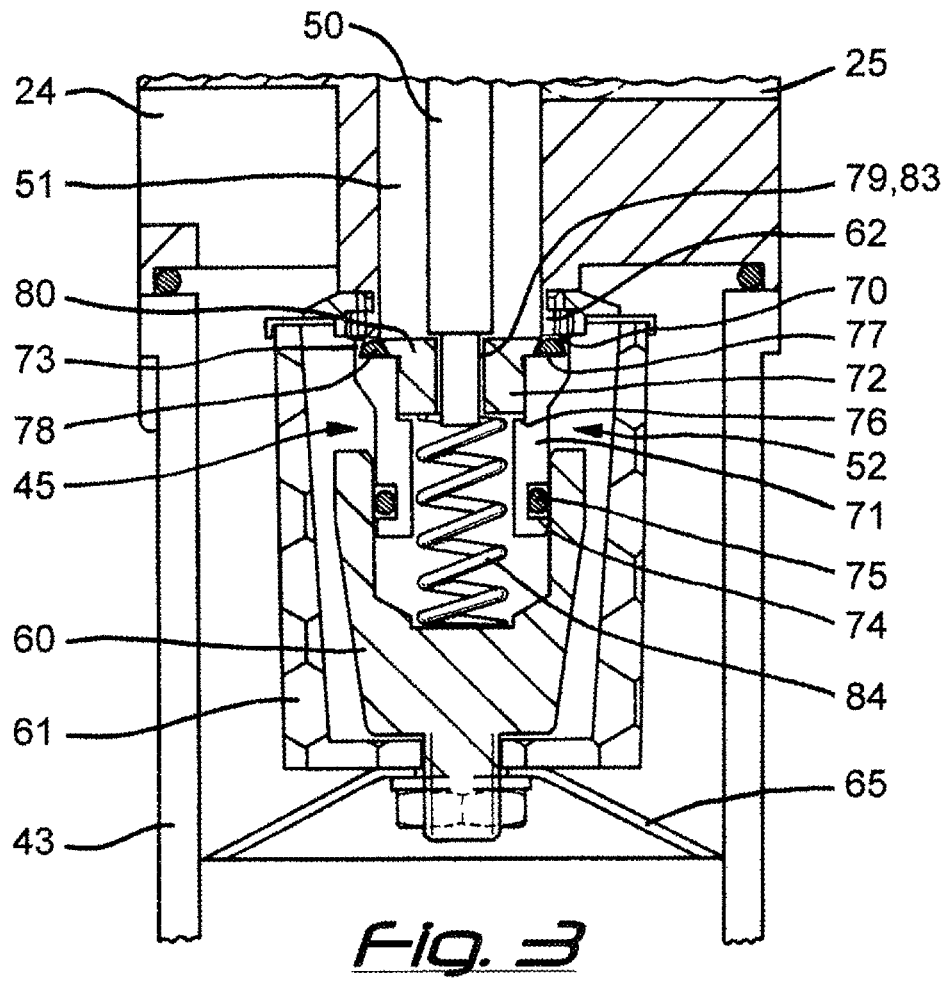
FIG. 3 is an enlarged view of a supply valve assembly of the volume booster of FIG. 2.
Figure 3A:
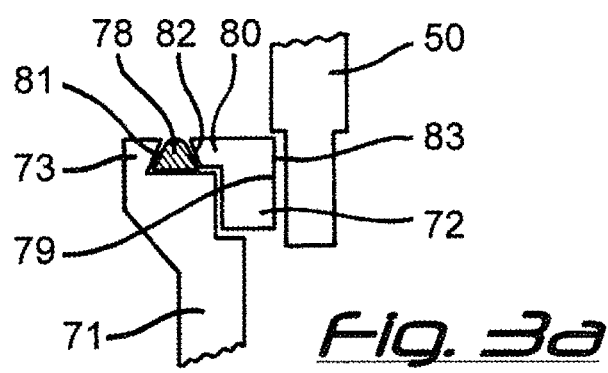
FIG. 3a is an enlarged view of part of a sealing arrangement of the supply valve assembly of FIG. 3.
Figure 4:
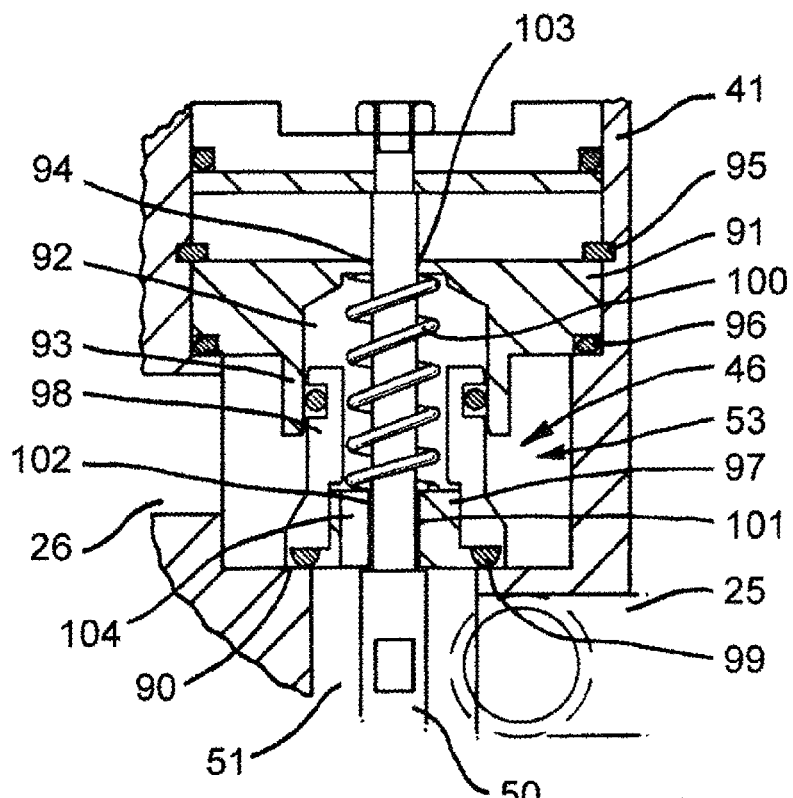
FIG. 4 is an enlarged view of the quick exhaust valve of the volume booster of FIG. 2.

An exemplary volume booster and combined filter/drain device 20 is shown in detail in FIGS. 2 to 4. The device 20 comprises a three-part housing 40 with a central section 41 interposed between an upper pilot cap 42 and a lower cap 43. The central section 41 defines at spaced locations on a first wall 41a, the inlet 24 and the exhaust port 26 and, on the opposite wall 41b, the outlet 25. It also contains a major part of a piston-operated valve stem assembly 44, including in particular a quick exhaust valve feature, as described below.

The fluid communication between the inlet 24 and outlet 25 in the main flow path 19 is interrupted by a supply valve chamber 45 defined in the lower cap 43 whereas the reverse exhaust flow between the outlet 25 and the exhaust port 26 is interrupted by an exhaust valve chamber 46 defined in the central section 41 of the housing 40, that forms part of a quick exhaust valve.

The pilot cap 42 is penetrated by the pilot port 27 that provides fluid communication with an upper surface of a piston 47 of the valve stem assembly 44. The port 27 is interrupted by a conventional bypass screw 48 situated in a transverse bypass port 49 that is adjustable by a screw-driver to restrict and damp the flow through the pilot port 27 as is well-known in the art.

The valve stem assembly 44 comprises an elongate valve stem 50 that extends through a central vertical passage 51 in the central section 31 and terminates at a first end in a supply valve assembly 52 disposed in the supply valve chamber 45 in the lower cap 43, and at a second end in the piston 47. At a location intermediate the two ends the stem supports an exhaust valve assembly 53 in the exhaust valve chamber 46. The valve stem 50 is stepped at two locations to define first and second annular shoulders 54, 55 for interaction with the supply and exhaust valve assemblies 52, 53. The first annular shoulder 54 is defined adjacent to a lower end of the stem 50 and abuts the supply valve assembly 52 in the supply valve chamber 45 whereas the second annular shoulder 55 is defined approximately mid-way along the length of the stem 50 and abuts the exhaust valve assembly 53 in the exhaust valve chamber 46.

The vertical passage 51 in the central section 41 affords a cylindrical shaped clearance around the intermediate section of the stem 50 and extends between the supply valve and exhaust valve chambers 45, 46 so as to interconnect them with the exhaust port 26.

The supply valve chamber 45 is defined in part by the interior of a cup member 60 disposed inside a substantially concentric cup-shaped filter 61 whose mouth is fixed around a cylindrical wall 62 defined on a bottom end of the central portion 41 of the housing 40. The filter 61 is made from any suitable porous material such as, for example, sintered stainless steel, nylon or other plastics and is designed to filter out contaminants such as oil, water vapour and particulates from the compressed air admitted through the inlet 24. The filter 61 has an aperture 63 in its bottom wall in which a threaded spigot 64 defined on the bottom of the cup member 60 is supported. A cone shaped baffle plate 65 is fixed to the threaded spigot 64 by a nut and is designed to direct incoming compressed air around and through the filter 61. There is a small annular clearance between the baffle plate 65 and the interior surface of the lower cap 43 to allow passage of water to a drain 66 supported in an aperture in the bottom of the cap 43. The drain 66 is of conventional configuration comprising a manually operable ported screw 67 that can be rotated to release a ball 68 so as to allow water that collects at the bottom of the housing 40 to drain past the ball 68 and through the screw 67. It will be appreciated that an automatic drain (again of known configuration) may be used in place of a manually operated drain.

The valve seat 70 for the supply valve assembly 52 is defined at an annular lower edge of the wall 62 at the end of the end of the central passage 51. The supply valve assembly 52 comprises a poppet-style valve with a cylindrical sleeve 71 and a flat-faced poppet 72 fixed thereto. The sleeve 71 has generally cylindrical inner and outer surfaces, the latter being outwardly flared at an upper end where it terminates in a lip 73 that faces the annular valve seat 70. An outer surface of the lower end of the sleeve 71 is designed to fit snugly and slidably within in the interior of the cup member 60 and an annular groove 74 towards its lower end for receipt of an O-ring seal 75 that seals against the interior surface of the cup member 60. An inner surface of the sleeve 71, which is intended to receive the poppet 72, is radially stepped at 76 to provide a stop and defines an annular groove 77 immediately radially inboard of the lip 73 for receipt of a sealing ring 78 for sealing the valve assembly 52 against the seat 70. The poppet 72 comprises a cylindrical body penetrated by a central bore 79 for receipt of the lower end of the valve stem 50 and has a radially outward extending flange 80 that extends into the annular groove 77 in the sleeve 71 where it abuts the sealing ring 78. An inside surface 81 of the lip 73 and an outside surface 82 of the flange 80 each face the sealing ring 78 and are tapered towards each other so as to hold the ring 78 in place between the poppet 72 and the sleeve 71.

The bore 79 has a diameter larger than that of the lower end of the stem 50 so as to provide a narrow annular clearance 83, the significance of which will become apparent. The poppet 72 is retained on the stem 50 between the first annular shoulder 54 of the stem 50 and the step 76 on the inside surface of the sleeve 71 and is biased against the shoulder 54 by virtue of a coil spring 84 disposed between a lower face of the poppet 72 and the bottom of the interior surface of the cup member 60.

The annular clearance 83 between the valve stem 50 and the poppet 72 affords a leak path for the air so that the pressure acting on both faces of the supply valve poppet 72 is equal. This ensures that the fluid forces acting on each side of the poppet are substantially balanced.

The exhaust valve chamber 45 is defined in the central section 41 immediately above the vertical passage 51 and adjacent to the exhaust port 26. It has a diameter greater than that of the vertical passage 51 and thus defines an annular seat 90 for seating of the exhaust valve assembly 53. The chamber 45 is closed at its upper end by an internal wall 91 that defines a cup-shaped cavity 92 with a cylindrical guide wall 93 for receipt of the exhaust valve assembly 53. The wall 91 is penetrated by a central bore 94 for receipt of the valve stem 50 and is retained in the central section 41 by a retaining ring (e.g. a circlip or the like) 95.

An O-ring seal 96 is provided between the internal wall 91 and the wall of the central section 41 to prevent air passing between them.

The exhaust valve assembly 53 is of similar configuration to the supply valve assembly 52 in that it has the same sleeve and poppet arrangement. The poppet 97 is received in the sleeve 98 in the same manner as for the supply valve assembly 52. The sleeve 98 and poppet 97 are again configured to retain a valve sealing ring 99 between them, the sealing ring 99 sealing against the seat 90. A coil spring 100 disposed around the stem 50 acts between the poppet 97 and the internal wall 91 so as to bias the exhaust valve assembly 53 against the seat 90. The bore 101 in the poppet 97 is again of such as size to define a clearance 102 between the poppet 97 and the stem 50 so as to provide a leak path for air from the vertical passage 51 to the exhaust valve chamber 46, thereby ensuring that the pressure on each face of the poppet 97 is equal. Similarly, there is an annular clearance 103 between the internal wall 91 and the stem 50 defined by the central bore 94, the clearance 103 affording a leak path for air from the exhaust valve chamber 46 to the piston 47.

It will be understood from the above description that the springs 84, 100 serve to bias both the supply and exhaust valves assemblies 52, 53 into normally closed positions in which they are seated against the respective valve seats 70, 90.

In both cases the leak paths provided by the clearances 83, 102 between the valve assemblies 52, 53 and the stem 50 ensure equal pressures are present on each side of the poppets 72, 97. This means that the forces on each side are balanced and the valve stem 50 only has to overcome the force of the springs 84, 100 in opening either of the valve assemblies 52, 53. Moreover, the leak paths ensure that the pressure applied by the main fluid flow 19 between the inlet 24 and outlet 25 does not serve to lift the valve assemblies 52, 53 off their respective seats 70, 90.

It is to be appreciated that the leak paths 83, 102 may be provided, as an alternative or as an addition, through a passage defined in the poppet 73 itself. An example of this is illustrated in the exhaust valve assembly of FIG. 4 in which there is a bore 104 through the poppet 97 offset from the central bore 101.

The piston 47 divides the interior of an upper part of the central section 41 of the housing into upper and lower variable volume chambers 110, 111, the upper chamber 110 being closed by the pilot cap 42 but in fluid communication with the pilot port 27 by passage 112. It is fixed the upper end of the valve stem 50 and is sealed to an interior surface of the central section 41 by an O-ring style seal 113 disposed in an annular groove 114 defined in the peripheral surface of the piston 47.

The lower cap 43 is fixed to central section 11 of the housing 40 by retaining screws (not shown) and sealed by an O-ring seal 115 disposed in a groove. The pilot cap 42 has a depending spigot 116 which is received inside the central section 41 and sealed thereto by O-ring seal 117.

The volume booster 20a effectively operates as a three port, three position block-before-bleed valve (as represented diagrammatically in FIG. 1) as both the supply and exhaust valve assemblies 52, 53 are normally closed by the springs 84, 100 as shown in FIGS. 2 to 4. In this position the valve stem 50 is in a central position such that the annular shoulders 54, 55 do not act on the respective valve assemblies 52, 53 so as to lift them from their respective seats 90, 100 and thus air is not transmitted to the actuator 12 or to the exhaust port 26.

The operation of the valve stein assembly 44 is dictated by the balance of the respective pressure in the upper and lower chambers 110,112. If the pressure in the upper chamber 110 is greater than that in the lower chamber 111 the resulting force moves the piston 47 and the valve stem assembly 44 downwards so as to allow supply of compressed air. Conversely if the pressure in the lower chamber 111 is greater than that in the upper chamber 110 the piston 47 and valve stem assembly 44 moves upwards so as to allow exhaust.

The upper chamber 110 receives a pilot air pressure signal through the passage 112 whereas the lower chamber 111 receives air that flows from the outlet 25, up the vertical passage 51 and through leak paths 102, 103 around the stem 50. Thus when the pilot signal pressure delivered to the upper chamber 110 is at a level where it is greater than that in the outlet 25, the pressure in the upper chamber 110 exceeds that in the lower chamber 111 and the piston 47 is forced downwards thereby moving the valve stem assembly 44 downwards. This has the effect of opening the supply valve assembly 52 as the first annular shoulder 54 acts on the poppet 72 and moves it downwards against the biasing force applied by the spring 84. The poppet 72 carries the sleeve 71 with it so the sealing ring 78 lifts off the seat 70 thereby opening the valve assembly 52 and allowing main air flow to pass from the inlet 24 to outlet 25 and on to the actuator 12.

If the pressure in the actuator cylinder 14 (and therefore at the outlet 26) exceeds the pilot signal pressure as a result of a reduction in the latter or an increase in the former, this is manifested by a pressure difference across the piston 47. In particular the pressure in the lower chamber 111 is greater than that in the upper chamber 110 with the result that the piston 47 and valve stem assembly 44 is forced upwards. This lifts the valve stem 51 and serves to open the exhaust valve assembly 53 whilst leaving the supply valve assembly 52 in the closed position. Since the lower end of the stem 50 is not fixed in the bore 79 of the poppet 72 it moves relative thereto. At the same time, the second annular shoulder 55 bears against the poppet 97 of the exhaust valve assembly 53 so as to move it upwards against the biasing force of the spring 100. The poppet 97 carries with it the sleeve 98 so that the sealing ring 99 is lifted off the seat 90 to open the exhaust valve assembly 53. In this position air from the outlet 25 can vent through the exhaust port 26 via the exhaust valve chamber 46. Since the exhaust port 26 is of the same diameter as the inlet 24 and outlet 25 the exhaust flow can occur at a rate that is equivalent to the flow of the main air flow through the inlet 24 and outlet 25. Once the pilot signal and outlet pressures have equalised the pressure in each of the upper and lower chambers 110, 111 are the same and the exhaust valve assembly 53 moves back to the closed position shown in FIGS. 2 and 4.

It will be understood from the above process that the volume booster is effectively able to detect when the downstream pressure at the actuator 12 rises above the demanded pressure set by the positioner 22, this is sensed by the booster and the excess actuator pressure is allowed to exhaust until it reaches the desired pressure. The exhaust valve assembly 53 and piston 47 thus combine to act in the manner of a pilot-operated quick exhaust valve. In particular, the exhaust flow is modulated by the difference in pressures between the pilot flow and the downstream cylinder pressure. In instances where the downstream cylinder pressure greatly exceeds the pilot pressure or the pilot pressure is set to a negligible value, the arrangement allows quick exhaust by allowing exhaust valve assembly 53 to lift fully from its seat 90. This can obviate the need for additional pressure relief valves in the control circuit in some applications but in other applications there may be benefit in combining such a volume booster with integral quick exhaust valve with separate quick exhaust valves as described below.

It is to be appreciated that the pilot-operated quick exhaust valve feature can form an integral part of a volume booster 20a (whether or not that booster has an integral filter and drain feature) as described above or can be provided as a separate component in the circuit as will be described below. In other embodiments the pneumatic circuit can include both a volume booster 20a with an integral quick exhaust valve and one or more separate quick exhaust valves.

In the arrangement described above the positioner 22 sets the pilot pressure in pilot line 23 to the desired pressure in the cylinder 14 and therefore the outlet 25. This is delivered to the pilot port 27 when the two control valves 29, 30 are open. However, the high flow rate required for fast actuator stroking is provided by air flow in the main flow line 19 either from the compressor 16 to the actuator 12 via the booster 20 or from the actuator cylinder 14 to the exhaust 26 via the booster 20. As a result of the force balance arrangement afforded by leak path clearances 83, 102, 103 the pressure difference across the piston 47 equalises so that the valve stem assembly 44 returns to the normally closed position. The piston 47 can thus be made smaller than in conventional designs as the forces required to move the valve stem assembly 44 are not so large. This allows the volume booster device to be more compact thereby saving on space.

The device allows an unregulated high flow input pressure to be translated into a high flow output at a regulated pressure whose magnitude is determined substantially by the pressure of the low flow pilot fluid. The volume booster effectively acts as a filter regulator. This allows a conventional high flow filter regulator to be omitted from the main flow line 19 and a smaller low flow regulator can instead be provided in the control flow line 23.

The sealing rings 78, 99 of each of the valve assemblies 52, 53 seal against the respective valve seats 70, 90 at an effective sealing diameter with respect to the central axis of the booster (which coincides with that of the stem 51). The sealing rings 75 provided in the outside surface of the sleeves 71, 95 are designed to seal against the respective inner surfaces of the cup member 60 and the body 91 at the same diameter as the effective sealing diameter. This ensures that no differential forces act on the valves when the same pressure acts on each end which might otherwise tend to open the valve assemblies.

The device also allows for operating air to be exhausted much quicker than in conventional devices that direct the air to dissipate through a port in the diaphragm assembly and is more compact than providing an external exhaust conduit. It eliminates the need to provide a separate exhaust conduit or circuit.

In some applications the filter drain feature 61, 66 may be omitted and a shallower lower cap is provided with the cup member replace by an equivalent cup-shaped recess in the cap. An example is illustrated in FIGS. 6 to 9.

Figure 5:
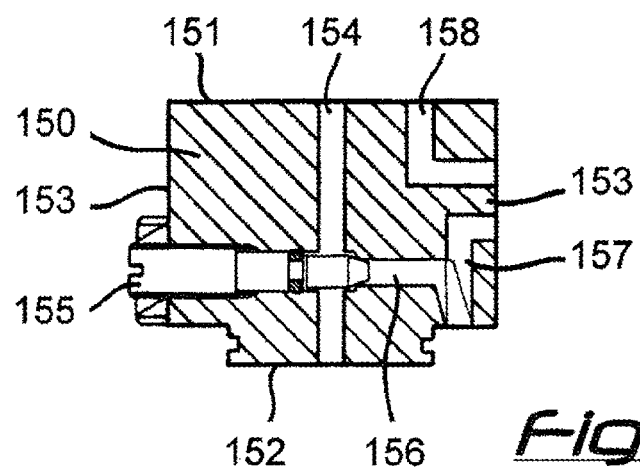
FIG. 5 is a longitudinal sectioned view of an alternative embodiment of part of the housing of the device of FIG. 2.
Figure 6:
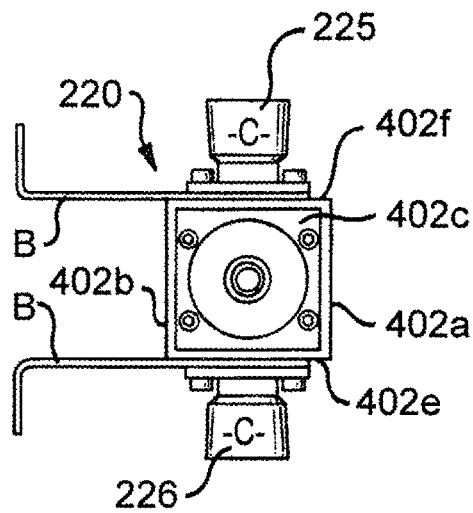
FIG. 6 is a plan view of an alternative embodiment of the volume booster device of FIGS. 1 to 5.
Figure 7:
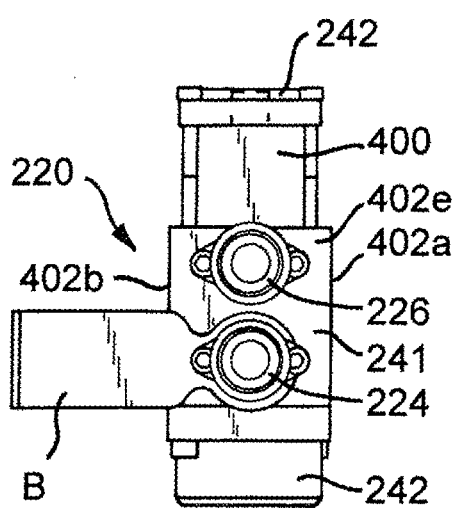
FIG. 7 is a side view of the device of FIG. 6.
Figure 8:
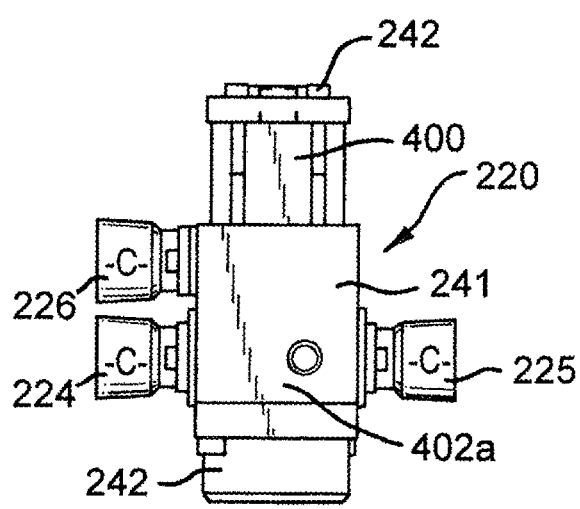
FIG. 8 is a front view of the device of FIG. 7.

The volume booster of FIGS. 6 to 9 has many features in common with that depicted in FIGS. 1 to 5 and these are given the same reference numerals but increased by 200 and components will be not described in any detail except in so far as they differ from their counterparts of FIGS. 1 to 5. The volume booster device 220 again has a main central section 241 defining the inlet 224, outlet 225 and the exhaust port 226. In FIGS. 6 to 8 the inlet 224, outlet 225 and exhaust port 226 are shown with cylindrical connector ports C fitted and the body is fitted a pair of brackets B by which it may be fixed to a suitable support or back plate (not shown) in use. The main central section 241 of the body is connected between a diaphragm housing 400 and a lower cap 243. The diaphragm housing 400 contains a diaphragm assembly 401 and is closed by a pilot cap 242.

The main central section 241 of the body is a parallelepiped with front, rear, upper, lower and first and second opposing side faces 102a, 402b, 402c, 402d, 402e and 402f which have been machined to define different features. The air inlet 224 and outlet 225 (ignoring the connector ports C) extend from, respectively, the first and second side faces 402e, 402f of the body at each end of an operating fluid flow path which is interrupted by an intervening supply valve chamber 215 defined in the lower cap 243. The exhaust port 226 extends from the first side face 402e, above the inlet 224, to an exhaust valve chamber 246 defined in the main central section 241 of the body.

The pilot cap 242 is penetrated by the pilot port 227 which provides fluid communication with the diaphragm assembly 401. The port 227 has an orifice 403 to restrict and damp the flow.

The central section 241 houses a valve stem assembly 244 which extends through a central vertical passage 251 in the central section 241 into the diaphragm housing 400 at one end and the lower cap 243 at the other end. As in the preceding embodiment the valve stem assembly 244 comprises an elongate stem 250 having a first end that extends into the supply valve chamber 245, a second end connected to the diaphragm assembly 401 and an intermediate section that passes through the exhaust valve chamber 246.

In this particular embodiment, the supply valve chamber 245 is defined by a bore 260 defined in the lower cap 243 and an internal clearance between an inner surface of the cap 243 and the central section 241. The integral filter and drain features in the lower cap are not present in this embodiment.

The valves are again poppet-style valves with a cylindrical sleeve 271 and a flat-faced poppet 272 fixed thereto, both of the same configuration as in the previous embodiment. The sleeve 271 is designed to fit snugly and slidably in the bore 260 in the lower cap 213.

Once again the annular clearance 283 between the valve stem 250 and the poppet 272 affords a leak path for the air so that the pressure acting on both faces of the supply valve poppet 272 is equal. This ensures that the fluid forces acting on each side of the poppet are substantially balanced.

The exhaust valve chamber 245 is again defined in the main central section 211 immediately above the vertical passage 251 and adjacent to the exhaust port 226. The chamber 245 is again closed at its upper end by an internal wall 291 that defines a cup-shaped cavity 292 and a cylindrical guide 293. The wall 291 is again penetrated by a central bore 291 for receipt of the valve stem 250.

The exhaust valve assembly is of the same configuration as that in the preceding embodiment and has the same sleeve and poppet arrangement as the supply valve. The bore 301 in the poppet 297 is again of such as size to define a clearance 302 between the poppet 297 and the stun) 250 so as to provide a leak path for air from the vertical passage 251 to the exhaust valve chamber 246, thereby ensuring that the pressure on each face of the poppet 297 is equal. Similarly, there is an annular clearance 303 between the internal guide wall 91 and the stem 250 defined by the central bore 294, the clearance affording a leak path for air from the exhaust valve chamber 246 into the diaphragm housing 400.

The diaphragm assembly 401 divides the diaphragm housing 400 into upper and lower variable volume chambers 310, 312 as before. The assembly comprises a piston 247 which is fixed to the upper end of the valve stem 250 and is sandwiched between upper and lower rolling diaphragms 404, 405. The upper diaphragm 404 is held against an upper surface of the piston 247 by means of a support washer 406 that is fixed in place by means of a screw 407. The peripheral outer edge of the diaphragm 404 has a lip 408 that is received an annular groove 409 defined in the pilot cap 242 and is held in place by the wall of the diaphragm housing 400. Similarly, the lower diaphragm 405 is held against a lower surface of the piston 247 by a washer 410 and a collar 411 fixed to the valve stem 250. The peripheral outer edge also has a lip 412 which is retained in an annular groove 413 defined in the central section 241 of the housing body by the diaphragm housing wall.

The lower cap 243 is fixed to main central section 241 of the body by retaining screws (not shown) and sealed by an O-ring seal 414 disposed in a groove.

Figure 9:
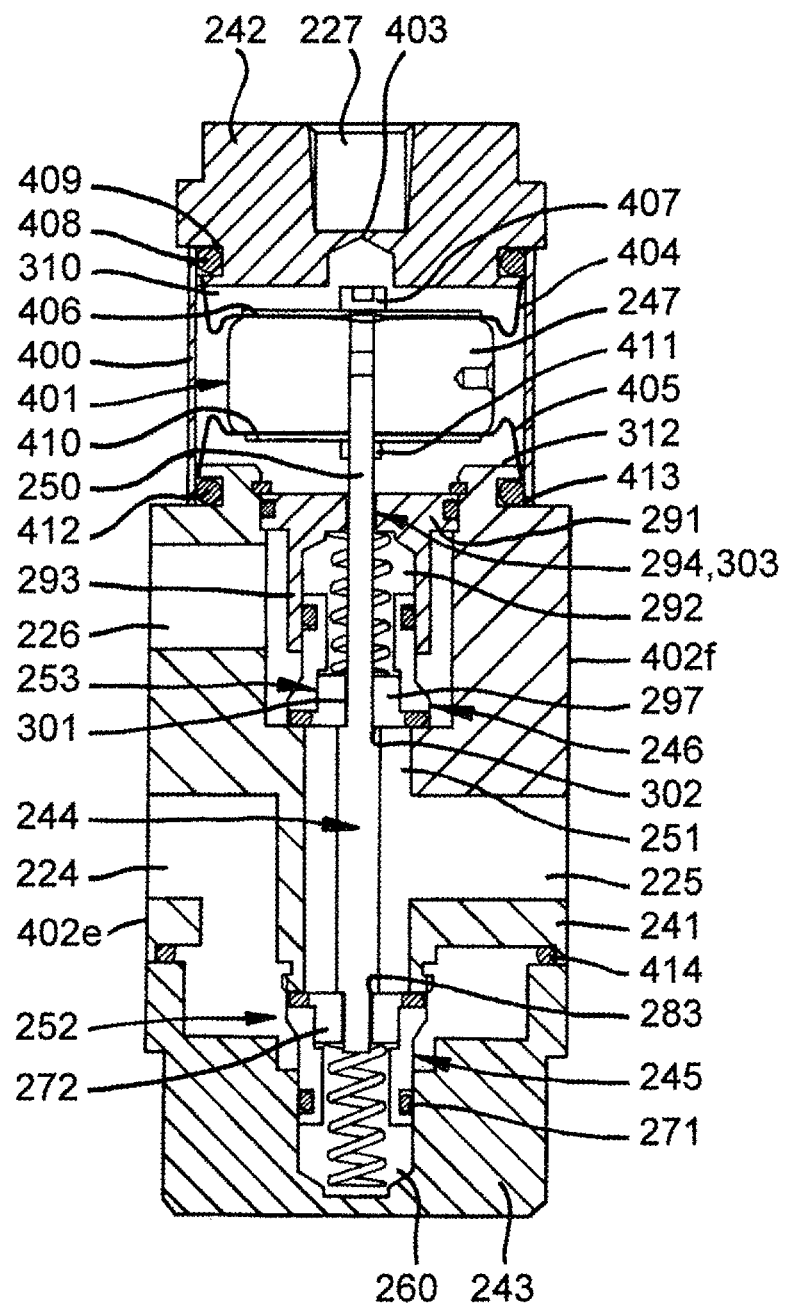
FIG. 9 is a cross section along line A-A of FIG. 7.

When the volume booster is installed the inlet 224 is connected to a supply of operating air and the outlet is connected to the actuator. As in the preceding embodiment the booster effectively operated as a three port, three position block-before-bleed valve as both the supply and exhaust valve assemblies are normally closed by the springs as shown in FIG. 9.

The operation of the valve stem assembly 244 is dictated by the balance of the respective pressure in the upper and lower chambers 310, 312, as before. If the pressure in the upper chamber 310 is greater than that in the lower chamber 312 the resulting force moves the piston and the valve stem assembly downwards. Conversely if the pressure in the lower chamber 312 is greater than that in the upper chamber 310 the piston moves upwards.

The upper chamber 310 receives a pilot air pressure signal through the orifice 403 whereas the lower chamber 312 receives air that flows from the outlet 225, up the vertical passage 251 and through leak paths 302, 303 around the stem 250. Thus when the pilot signal pressure delivered to the upper chamber 310 is at a predetermined level where it is greater than that in the outlet 225, the pressure in the upper chamber 310 exceeds that in the lower chamber 312 and the diaphragm assembly is forced downwards thereby moving the valve stem downwards. This has the effect of opening the supply valve assembly 252 and allows air flow from the inlet 224 to outlet 225 and on to the actuator 212.

If the pilot signal pressure is reduced or the outlet pressure increases to an extent where the pressure in the lower chamber 312 is greater than that in the upper chamber 310, the diaphragm assembly 401 moves upwards. This lifts the valve stem 251 and once it has passed the central position shown in FIG. 9, the stem serves to open the exhaust valve assembly 253 whilst leaving the supply valve assembly 252 in the closed position. In this position air from the outlet 225 can vent through the exhaust port 226. Since the exhaust port 226 is of the same diameter as the inlet 224 and outlet 225 the exhaust flow can occur at a rate that is equivalent to the flow of the operating air through the inlet and outlet. Once the pilot signal and outlet pressures have equalised the pressure in each of the upper and lower chambers 310, 312 are the same and the exhaust valve assembly 253 moves back to the closed position shown in FIG. 9.

As a result of the force balance arrangement afforded by clearances 301, 302 between the valve stem 250 and the valve assemblies 252, 253, the diaphragm assembly 401 can be made smaller than in conventional designs as the forces required to move the stem 250 are not so large. This allows the volume booster device of the present invention to be more compact.

FIG. 10 shows the same volume booster with a modified diaphragm assembly. Parts corresponding to those of the embodiment described above in relation to FIGS. 6 to 9 are given the same reference numerals for ease of understanding and convenience and are not further described except in so far as the differ from their counterparts of FIGS. 6 to 9. The diaphragm assembly piston 287 is sealed to the inside surface of the diaphragm housing 400 by means of an O-ring 420 disposed in an annular channel 421 defined on the piston periphery. This ensures that even if the diaphragms 404, 405 fail the upper and lower chambers 310, 312 remained separated. The upper chamber 310 has a vent 422 defined by a small opening in the wall of the housing. If the upper diaphragm 404 fails the pilot pressure signal entering through the pilot inlet 227 will leak through the vent 422. As a consequence the reduced pressure in the upper chamber 310 will generally mean that the supply valve assembly 252 will either be moved to the closed position or will be open but with the outlet pressure lower than required. This is in contrast to conventional volume boosters that fail with the supply valve in the open position.

If the lower diaphragm 405 fails air pressure in the lower chamber 312 leaks through the lower diaphragm into the space between it and the piston 287. The air is able to leak past the O-ring seal 420 and out through the vent 422. The result of this is that the outlet pressure is will be slightly lower than normal.

The provision of a vent 422 of this kind, thus eliminates the requirement for a downstream pressure relief valve.

FIG. 11 shows a further alternative arrangement in which the rolling diaphragm assembly 401 is replaced by a close-fit metal piston that is very similar to the piston 87 of the embodiment of FIGS. 2 to 5. The piston has a peripheral PTFE, sealing ring 217 (sometimes referred to as a "wiper seal"). In another variations the sealing ring may be omitted. The structure of the booster is otherwise almost identical to the preceding embodiments except that the housing and the pilot cap have been modified slightly.

A solenoid-operated valve may be provided at the pilot inlet port 227 to switch the pilot signal on or off as required.

The diaphragm assembly in each embodiment could be replaced by an electrically-operated solenoid having an output stroke that acts on the valve stem.

It will be understood that the diaphragm assembly could be adapted so that the outlet pressure is proportional to the pilot pressure signal rather than equal to it.

It will be appreciated that volume booster embodiments described in relation to FIGS. 6 to 11 above may be fitted with filter in the lower cap of the kind described in relation to the embodiment of FIG. 2. The filter may be constructed, from a rigid porous material such as, for example, a sintered stainless steel and serves to remove particulate or liquid/moisture contaminants from the operating fluid.

The above-described embodiments can each be used in conjunction with the stacking directional control valves described in our co-pending International Patent Application No. PCT/GB2007/004555 which may be used to control the supply of the pilot pressure signal to the pilot inlet of the volume booster and/or the quick exhaust valve.

It will be appreciated that the volume booster can be used in other applications with any gas or fluid and that it can be provided in a range of sizes to suit all applications and that all components including seals can be designed to operate at extreme temperatures such as those found in arctic conditions.

The volume booster may be fitted with a pressure gauge for visual inspection but is typically operated by a control system (not shown in the figures) so that operating and pilot fluid is supplied on demand when it is necessary to operate the valve positioner. There may be a solenoid-operated valve at the pilot inlet port that effectively serves to switch the pilot pressure on and off as required.

The arrangement of the device allows an unregulated high flow input pressure to be translated into a high flow output at a regulated pressure whose magnitude is determined substantially by the pressure of the low flow pilot fluid. It also allows for operating air to be exhausted much quicker than in conventional devices that direct the air to dissipate through a port in the diaphragm assembly and is more compact than providing an external exhaust conduit.

The exhaust port may be defined on any face of the front, rear and side faces 402a, 402b, 402e, 302f of the housing.

Figure 12:
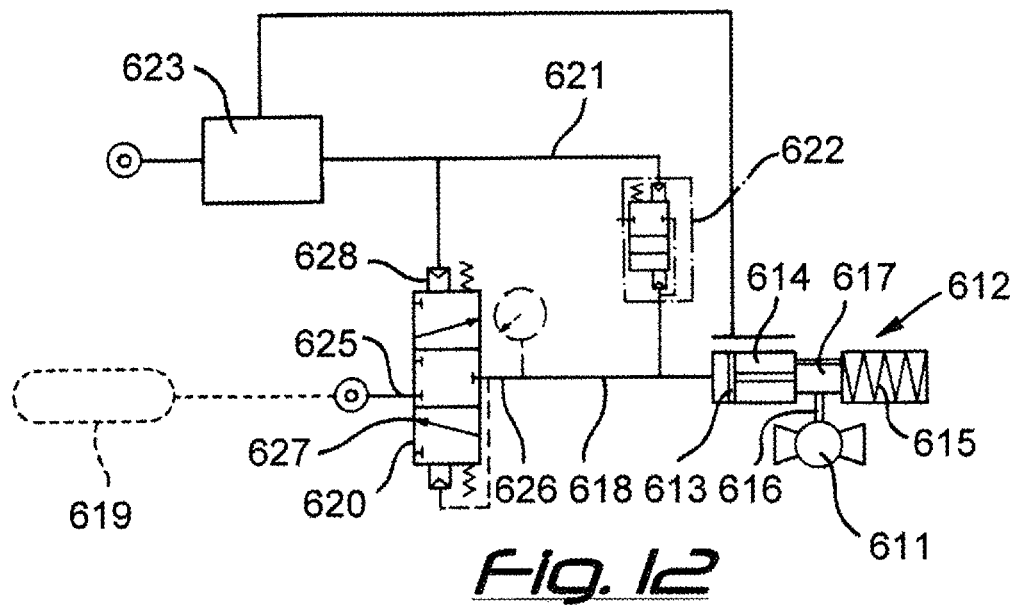
FIG. 12 is a schematic circuit diagram of a fluid pipeline with a valve, valve actuator and a second embodiment of pneumatic control circuitry including a quick exhaust valve in accordance with an aspect of the present invention.
Figure 12A:
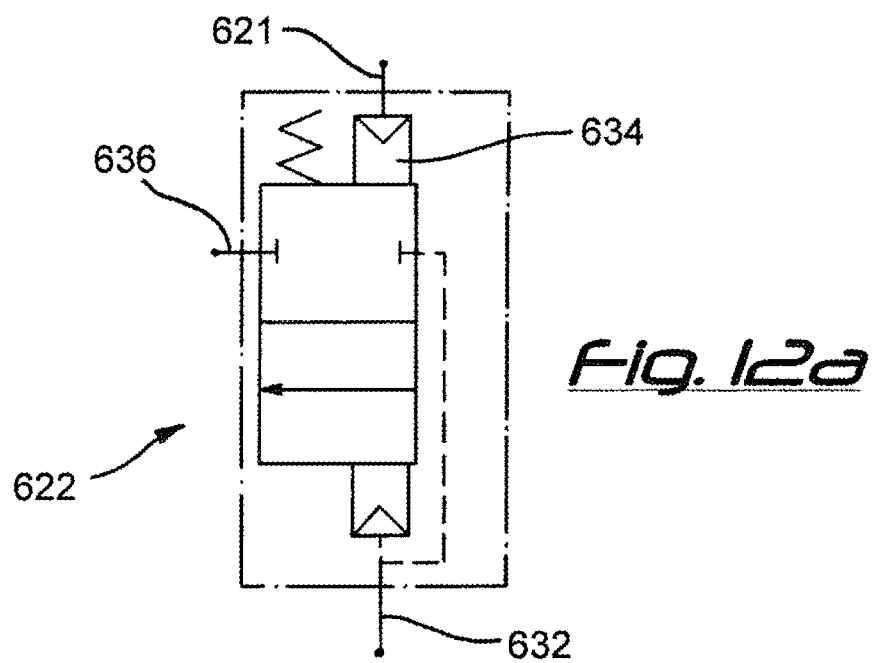
FIG. 12a is an enlarged view of a schematic representation of the quick exhaust valve of FIG. 12.

Referring now to the embodiment of FIGS. 12 and 12a of the drawings, a pipeline valve 611 is again operable between open and closed positions by a pneumatically-operated actuator 612, such as, in this case, a piston 613 disposed in a cylinder 614. In the embodiment shown the piston 613 is a single-acting type with a spring 615 biasing it in a direction against a force applied by compressed air introduced into the cylinder 614 to the left of the piston. It will be appreciated that in an alternative embodiment of the present invention a double-acting piston cylinder arrangement may be used with compressed air being selectively introduced or exhausted from the cylinder on each side of the piston. The valve is in this exemplary embodiment, a ball valve this is rotationally disposed within the valve body and has an actuation stem 616 that is rotatable by the actuator 612 via a suitable mechanical link 617.

Compressed air for operating the actuator 612 is delivered along a main supply line 618 from an upstream source 619 (such as a compressor) to a volume booster 620 upstream of the cylinder 614 of the actuator 612. A separate pilot line 621 supplies pneumatic pilot control signals to the volume booster 620 and to a quick exhaust valve 622 connected to the cylinder 614 of the actuator 612.

The pneumatic pilot control signals are generated by a positioner 623 in order to move the actuator 612 to a desired position to operate the valve 611. A position sensor 624 associated with the actuator 612 may sense the position of the piston 613 within the cylinder 614 and generate an electrical signal representative of that position, which signal is fed back to the positioner 623. In this manner the positioner 623 may operate with closed-loop feedback control to determine the required pressure of the pneumatic control signal. The positioner 623 may be microprocessor based and may incorporate transducers that convert electrical signals (e.g. current) to pneumatic pressure for this purpose.

One or more directional control valves (not shown) may be provided in the pilot line 621 and are selectively operable to allow the pneumatic control signals to flow from the positioner 623 to the volume booster 620.

The volume booster 620 is a three-position, three port valve. It is normally closed as shown in FIG. 12 such that the main supply 618 is interrupted and is selectively operable by the pneumatic pilot signal to a second position in which it connects the supply line 618 to the actuator 612 and ensures that there is a sufficient sustained volumetric flow rate to pressurise the cylinder 614 so that the stroke speed of the actuator 612 is sufficiently high in a first direction. It can also be operable to a third position in which it permits exhausting of the air from cylinder 614 in the opposite direction.

The booster 620 has a main supply fluid inlet 625 and outlet 626 that supply the compressed air along the main flow line 619 to the actuator 612, an exhaust port 627 and a pilot port 628 for receipt of the pilot fluid (e.g. air) from the positioner 623. The inlet 625, outlet 626 and exhaust ports 627 are configured to allow air to flow at relatively high volumetric rates in comparison to the pilot port 628.

The quick exhaust valve 622 is a two-position, two port valve that is pilot-operated and biased to the position shown in FIGS. 12 and 12a where it is closed. The exemplary embodiment the valve in FIG. 13 comprises a three-part generally rectangular housing 630 having outer walls defining an internal cylindrical bore of varying dimensions and containing an internal disc-shaped wall 650 fixed to the outer walls. The housing 630 receives a reciprocal valve assembly 631. A first end of the bore defines an inlet port 632 and an inlet chamber 633 and an opposite end defines a pilot port 634 and pilot chamber 635. An intermediate part of the housing defines two pairs of opposed lateral exhaust ports 636 (only two are visible in FIG. 12) and combines with the valve assembly 631 to define first and second intermediate chambers 637, 638. It is to be understood that, in alternative embodiments, a different number of exhaust ports may be provided including, one, two, three, or more than four.

The valve assembly 631 comprises an elongate valve stem 640 having a screw head 641 at the first end and a threaded tip 642 at a second end. A cylindrical sliding shuttle member 643 is mounted on the stem 640 at the first end and is prevented from becoming separated from the stem 640 by the screw head 641. It has an outer diameter that is slightly smaller than the internal diameter of the housing 630 and an O-ring seal 644 is provided in an annular groove to seal the shuttle member 643 against the housing wall. At the second end a piston 645 is secured against an annular shoulder 646 on the stem 640 by a threaded nut 647 that is engaged with the threaded tip 642. The piston 645 similarly has an O-ring seal 648 to prevent leakage of air between it and the housing. The valve stem 640 passes through a central aperture 649 in an internal wall 650 of the housing 630, the stem 640 being axially displaceable relative to the internal wall 650. The stem 640 and piston 645 are fixed relative to one another and are moveable relative to the housing 630 in both directions along direction of the longitudinal axis of the stem 640, whereas the shuttle member 643 is moveable in the same directions with the stem 640 and piston 645 as well as relative thereto. The stem 640, piston 645 and shuttle member 643 are biased to the respective positions shown in FIG. 12 by a compression spring 651 that is coaxially disposed around the stem 640 and acts between the shuttle member 643 and the internal wall 650. A cylindrical recess 652 in the shuttle member 643 receives one end of the spring 651 to afford a compact arrangement.

As discussed above, both the shuttle member 643 and the piston 645 are sealed to the outer walls of the housing 630 so as to prevent air leaking between them. The shuttle member 643 is, however, penetrated by a pair of passages 653 so as to allow air in the inlet chamber 633 to pass into the first intermediate chamber 637, which is defined between the shuttle member 643 and the internal wall 650. There is a small annular clearance between the edge of the aperture 649 in the internal wall 650 and the outer surface of the stem 640 that allows leakage of air from the first intermediate chamber 637 into the second intermediate chamber 638, which is defined between the internal wall 650 and the piston 645.

In use, the inlet port 632 is connected to the cylinder 614, pilot port 634 is connected to the pilot line 621 and the exhaust ports 636 are connected to atmosphere. When pressurised by pilot pressure the piston is urged to the left, in FIG. 13, so as to reduce the volume of the second intermediate chamber 638. The cylinder pressure at the inlet port 632 is transmitted from the inlet chamber 633 through the passages 653 in the shuttle member 643 to the first intermediate chamber 637 where the air leaks into the second intermediate chamber 638 via the annular clearance between the internal wall 650 and stem 640 provided by aperture 649 in the internal wall 649. If the inlet pressure is the same as the pilot signal pressure the pressure in the second intermediate chamber 638 and in the pilot chamber 635 is the same and the piston 645 remains in the position shown in FIG. 13. If the inlet pressure is greater than the pilot pressure the pressure differential across the piston 645 causes it to move to the right against the biasing force of the spring 651. This has the effect of pulling the shuttle member 643 to the right so as to expose the exhaust ports 636 whereupon air from the cylinder 614 is exhausted to atmosphere until the inlet pressure drops and equilibrium is reached again whereupon the shuttle member 643 moves back under the biasing influence of the spring 651 to close the exhaust ports 636.

If the pilot pressure is removed entirely when the cylinder 614 is still pressurised, the pressure in the first intermediate chamber 637 exceeds that in the pilot chamber 635 with the effect that the piston 645 and shuttle member 643 are moved to the extremity of their travel stroke to the right, against the force of the spring 651. When this occurs the shuttle member 643 moves beyond the exhaust ports 636 such that they are fully open and the cylinder pressure is exhausted quickly to atmosphere.

It will be appreciated from the above that the quick exhaust valve 622 operates automatically to permit modulated exhaust flow when pilot pressure at the pilot port 634 is less than the cylinder pressure at the inlet 632, quick exhaust when there is little or no pilot pressure at port 634 and the cylinder 614 (and therefore the inlet chamber 633) is still pressurised or to prevent any exhaust when cylinder pressure 614 at the inlet 632 is substantially equal to or less than the pressure at the pilot port 634.

Figure 14:
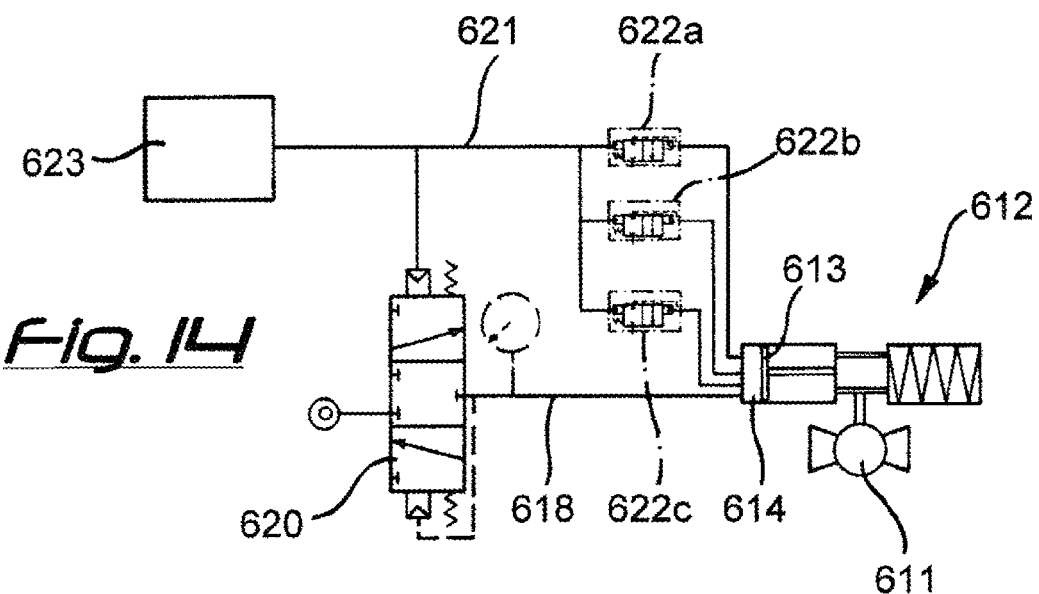
FIG. 14 is a schematic circuit diagram showing an alternative arrangement to FIG. 12 and in which there are multiple quick exhaust valves connected to the actuator, in accordance with an aspect of the present invention.

It is to be understood that the cylinder 614 may be exhausted through more than one quick exhaust valve as illustrated in FIG. 14 where three such valves 622*a*, 622*b*, 622*c* are shown, each being pilot-operated. In the embodiments of FIG. 12 and FIG. 14 the exhaust flow from the cylinder 614 may optionally be routed through the volume booster 620 in addition to the, or each, quick exhaust valve. The volume booster 620 may in itself have an integral quick exhaust valve arrangement which may be, for example, of the kinds described above, in relation to FIGS. 1 to 11. Alternatively it may be of conventional configuration.

The quick exhaust valve of the present invention not only allows the actuator cylinder 14 or 614 to be exhausted quickly so that the pipeline valve 10 or 610 can be closed quickly but also provides for pilot control for a controlled exhaust of the cylinder 14, 614. This allows for proportional control of the actuator 612, 612 and therefore better modulation of the pipeline valve 10, 610 position.

Figure 13:
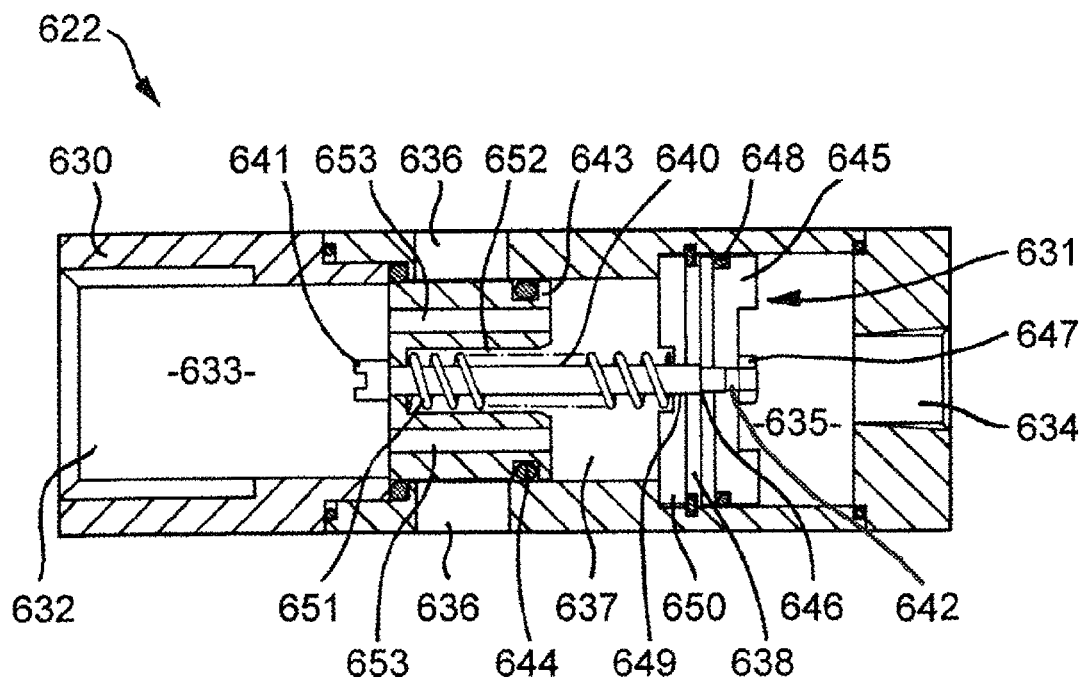
FIG. 13 is a longitudinal sectioned view of an exemplary embodiment of the exhaust valve in accordance with an aspect of the present invention.

The embodiments of FIGS. 12 to 14 can also each be used in conjunction with the stacking directional control valves described in our co-pending international Patent Application No. PCT/GB2007/004555 which may be used to control the supply of the pilot pressure signal to the pilot inlet of the volume booster 620 and/or the quick exhaust valve 622.

It will be appreciated that the quick exhaust valve 622 can be used in other applications with any gas or fluid and that it can be provided in a range of sizes to suit all applications and that all components including seals can be designed to operate at extreme temperatures such as those found in arctic conditions.

The embodiments described in FIGS. 1 to 4 can each be used in conjunction with the stacking directional control valves described in our co-pending International Patent application No. PCT/GB2007/004555 which may be used to control the supply of the pilot pressure signal to the pilot inlet 27. A modified pilot cap 150 is shown in FIG. 5 for this purpose. The cap has upper, lower and side surfaces 151, 152 and 153 and the stack of directional control valves is designed to be connected to an upper surface 151 of the cap 150. The cap is penetrated by a pilot port 154 which is interrupted by a transverse bypass screw 155 seated in a bypass passage 156, and first and second supplementary passages 157, 158. The first passage 157 extends from the lower surface 152, where it is connected to the main air flow line 19, to the side surface 153 where it is connected to control flow line 21 and the low flow filter regulator 31. The second passage 158 extends from the side surface 153, where it is connected to an outlet of the filter regulator 31, to the upper surface 151 where it is connected to the positioner 22 and the stack of directional control valves 29, 30 (and others where necessary).

It is will be appreciated by one of ordinary skill in the art that the invention has been described by way of example only, and that the invention itself is defined by the claims. Numerous modifications and variations may be made to the exemplary design described above without departing from the scope of the invention as defined in the claims. For example, although quick exhaust valve is described above in relation to controlling an actuator in a valve positioner they can be used in any application where a pressurised flow of fluid or gas is to be exhausted quickly. Similarly, although the volume booster device is described above in relation to controlling an actuator in a valve positioner it can be used in any application where the pressure of a large flow volume is to be regulated by a low flow pilot signal.

The described and illustrated embodiments are to be considered as illustrative and not restrictive in character, it being understood that only the preferred embodiments have been shown and described and that all changes and modifications that come within the scope of the inventions as defined in the claims are desired to be protected. It should be understood that while the use of words such as "preferable", "preferably", "preferred" or "more preferred" in the description suggest that a feature so described may be desirable, it may nevertheless not be necessary and embodiments lacking such a feature may be contemplated as within the scope of the invention as defined in the appended claims. In relation to the claims, it is intended that when words such as "a," "an," "at least one," or "at least one portion" are used to preface a feature there is no intention to limit the claim to only one such feature unless specifically stated to the contrary in the claim. When the language "at least a portion" and/or "a portion" is used the item can include a portion and/or the entire item unless specifically stated to the contrary.

The invention claimed is:

1. A pilot-operated quick exhaust valve for exhausting fluid from a fluid actuator and comprising:
   a housing;
   the housing defining an inlet port for connection to an exhaust of the fluid actuator, a pilot control port for receipt of a pilot control signal and at least one exhaust port;
   a valve assembly reciprocal within the housing and comprising a piston connected to a valve member;
   the piston being disposed in the housing to define on a first side of the piston a variable volume pilot pressure chamber in fluid communication with the pilot port and, on a second side of the piston, a variable volume inlet pressure chamber in fluid communication with the inlet port, such that the piston is moveable in response to a pressure difference between the pilot port and the inlet port;
   the valve member being moveable with the piston between a first position in which it blocks fluid communication between the at least one exhaust port and the inlet port and a second position in which it opens the at least one exhaust port to allow for a maximum flow from the inlet and out through the at least one exhaust port;

an elongate valve stem;

wherein the piston is fixed to the valve stem and the valve member is movable relative thereto in the direction of a longitudinal axis of the stem; and wherein the valve member is biased to the first position by a biasing member, and movement of the piston in a direction such that the pilot pressure chamber decreases in volume moves the valve member towards the second position against the biasing force applied by the biasing member.

2. A pilot-operated quick exhaust valve according to claim 1, wherein the valve member is penetrated by at least one passage to allow fluid to flow from the inlet to the inlet pressure chamber so as to act on the first side of the piston.

3. A fluid control system for a fluid actuator comprising: a pressurised fluid supply line; an exhaust path; a pilot fluid control line for delivering fluid control signals; at least one pilot-operated quick exhaust valve according to claim 1, the inlet of the, or each, pilot-operated quick exhaust valve being connectable to an exhaust outlet of the actuator and the, or each, pilot control port being connected to the pilot fluid control line, the at least one exhaust port being in fluid communication with the exhaust path; and a volume booster for regulating the volumetric flow rate of the fluid to the fluid actuator, the volume booster having an inlet to the supply line, an outlet connectable to a supply port of the fluid actuator, and a pilot inlet connected to the pilot fluid control line.

4. A fluid control system according to claim 3, wherein the quick exhaust valve is integrally formed with the volume booster.

5. A pilot-operated quick exhaust valve according to claim 1, wherein the housing defines an internal wall disposed such that the inlet pressure chamber is divided into first variable volume chamber defined between the valve member and the internal wall and a second variable volume chamber defined between the internal wall and the piston.

6. A pilot-operated quick exhaust valve according to claim 5, wherein the internal wall is penetrated by at least one leak passage to allow fluid to flow between the first and second variable volume chambers.

7. A pilot-operated quick exhaust valve according to claim 5, further comprising a biasing member for biasing the valve member away from the internal wall.

8. A pilot-operated quick exhaust valve according to claim 7, wherein the biasing member acts between the valve member and the internal wall.

9. A pilot-operated quick exhaust valve according to claim 8, wherein the biasing member is compression spring.

10. A pilot-operated volume booster for controlling the volumetric flow rate of pressurised fluid from a source to a fluid actuator, the volume booster having a quick exhaust valve comprising:

a housing;

the housing defining an inlet port for connection to an exhaust of the fluid actuator, a pilot control port for receipt of a pilot control signal and at least one exhaust port;

a valve assembly reciprocal within the housing and comprising a piston connected to a valve member;

the piston being disposed in the housing to define on a first side of the piston a variable volume pilot pressure chamber in fluid communication with the pilot port and, on a second side of the piston, a variable volume inlet pressure chamber in fluid communication with the inlet port, such that the piston is moveable in response to a pressure difference between the pilot port and the inlet port;

the valve member being moveable with the piston between a first position in which it blocks fluid communication between the at least one exhaust port and the inlet port and a second position in which it opens the at least one exhaust port to allow for a maximum flow from the inlet and out through the at least one exhaust port;

an elongate valve stem;

wherein the piston is fixed to the valve stem and the valve member is movable relative thereto in the direction of a longitudinal axis of the stem; and wherein the valve member is biased to the first position by a biasing member, and movement of the piston in a direction such that the pilot pressure chamber decreases in volume moves the valve member towards the second position against the biasing force applied by the biasing member.

* * * * *